US008351695B2

(12) United States Patent
Tsuruoka

(10) Patent No.: US 8,351,695 B2
(45) Date of Patent: Jan. 8, 2013

(54) IMAGE PROCESSING APPARATUS, IMAGE PROCESSING PROGRAM, AND IMAGE PROCESSING METHOD

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 1339 days.

(21) Appl. No.: 12/037,190

(22) Filed: Feb. 26, 2008

(65) Prior Publication Data

US 2008/0240556 A1 Oct. 2, 2008

(30) Foreign Application Priority Data

Feb. 28, 2007 (JP) ................................. 2007-050726

(51) Int. Cl.
G06K 9/00 (2006.01)

(52) U.S. Cl. ...................................................... 382/167

(58) Field of Classification Search .......... 382/162–167; 358/518, 520; 348/234, 182
See application file for complete search history.

(56) References Cited

U.S. PATENT DOCUMENTS

| 5,239,378 | A  | * | 8/1993  | Tsuji et al. ..................... 348/625 |
| 5,241,386 | A  | * | 8/1993  | Tsuji et al. ..................... 348/607 |
| 5,296,920 | A  | * | 3/1994  | Sakaue et al. .................. 348/675 |
| 5,633,511 | A  | * | 5/1997  | Lee et al. ....................... 250/587 |
| 6,823,083 | B1 | * | 11/2004 | Watanabe et al. .............. 382/167 |
| 6,850,214 | B2 | * | 2/2005  | Nishitani et al. ................ 345/87 |
| 7,339,619 | B2 | * | 3/2008  | Tsuruoka ....................... 348/234 |
| 7,403,205 | B2 | * | 7/2008  | Zeng ............................. 345/590 |
| 8,139,848 | B2 | * | 3/2012  | Hasegawa ..................... 382/162 |

| 2002/0145678 | A1 | * | 10/2002 | Suzuki et al. .................. 348/675 |
| 2004/0032982 | A1 | * | 2/2004  | Nishizawa ..................... 382/171 |
| 2004/0218075 | A1 | * | 11/2004 | Tsuruoka ....................... 348/272 |
| 2005/0001935 | A1 | * | 1/2005  | Kiuchi et al. .................. 348/607 |
| 2005/0111018 | A1 | * | 5/2005  | Ueda et al. ..................... 358/1.9 |
| 2006/0028564 | A1 | * | 2/2006  | Baer ............................. 348/294 |
| 2008/0085062 | A1 | * | 4/2008  | Tsuruoka ....................... 382/284 |
| 2008/0240556 | A1 | * | 10/2008 | Tsuruoka ....................... 382/167 |
| 2009/0219416 | A1 | * | 9/2009  | Tsuruoka ....................... 348/241 |

(Continued)

FOREIGN PATENT DOCUMENTS

JP 03-127278 5/1991

(Continued)

OTHER PUBLICATIONS

Office Action issued by the Japanese Patent Office on Aug. 30, 2011 in connection with corresponding Japanese Patent Application No. 2007-050726.

*Primary Examiner* — Chan S Park
*Assistant Examiner* — Sean Motsinger
(74) *Attorney, Agent, or Firm* — Ostrolenk Faber LLP

(57) ABSTRACT

An image processing apparatus converts a color image signal into a luminance signal and a color signal in a predetermined color space (111), and performs tone conversion processing on the luminance signal on the basis of a predetermined tone conversion characteristic (112). A function for chroma correction processing is then set using the luminance signal, the tone conversion-processed luminance signal, a maximum value of the luminance signal in the color space, and a luminance value when a maximum chroma is indicated in a hue region to which the color image signal belongs, as parameters (113), whereupon chroma correction processing is performed on the color signal using the luminance signal, the tone conversion-processed luminance signal, and the set function (114).

34 Claims, 21 Drawing Sheets

U.S. PATENT DOCUMENTS

2010/0111414 A1 * 5/2010 Aragaki et al. .............. 382/167

FOREIGN PATENT DOCUMENTS

| JP | 2003-069825 | 3/2003 |
| JP | 2003-069846 | 3/2003 |
| JP | 2004-312467 | 11/2004 |
| JP | 2005-191711 | 7/2005 |
| JP | 2005-347811 | 12/2005 |
| JP | 2006-148248 | 6/2006 |
| WO | WO 2006120864 A1 * | 11/2006 |

* cited by examiner

| $R_{00}$ | $G_{10}$ | $R_{20}$ | $G_{30}$ | $R_{40}$ | $G_{50}$ |
|---|---|---|---|---|---|
| $G_{01}$ | $B_{11}$ | $G_{21}$ | $B_{31}$ | $G_{41}$ | $B_{51}$ |
| $R_{02}$ | $G_{12}$ | $R_{22}$ | $G_{32}$ | $R_{42}$ | $G_{52}$ |
| $G_{03}$ | $B_{13}$ | $G_{23}$ | $B_{33}$ | $G_{43}$ | $B_{53}$ |
| $R_{04}$ | $G_{14}$ | $R_{24}$ | $G_{34}$ | $R_{44}$ | $G_{54}$ |
| $G_{05}$ | $B_{15}$ | $G_{25}$ | $B_{35}$ | $G_{45}$ | $B_{55}$ |

*FIG. 2*

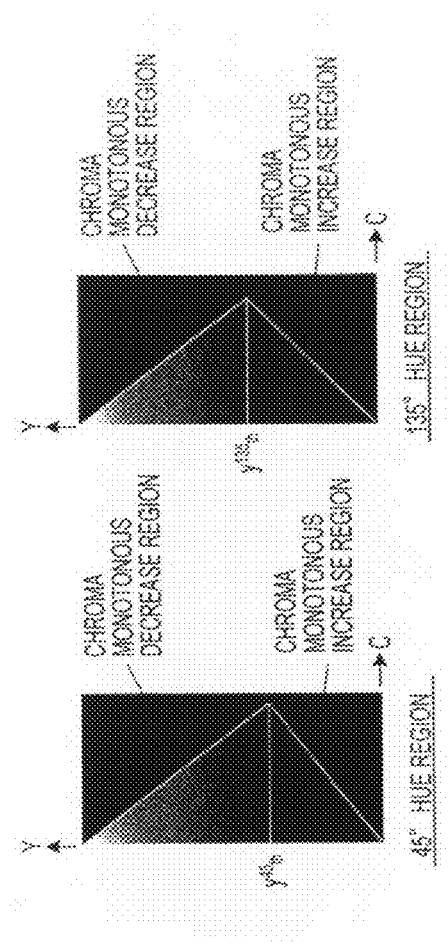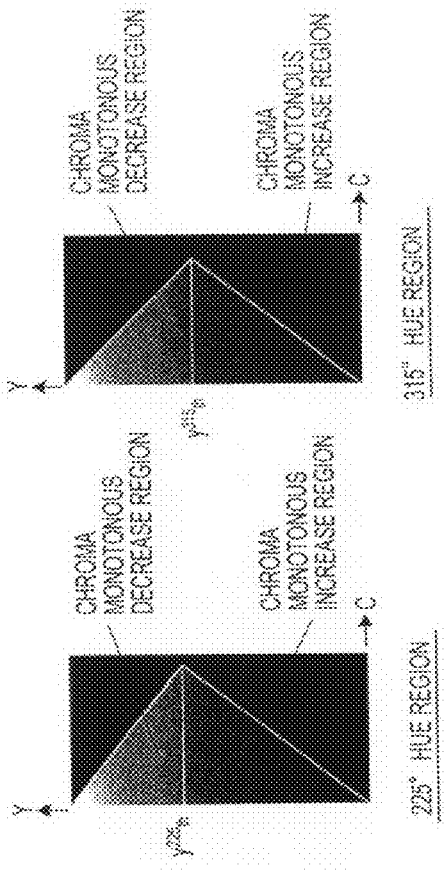

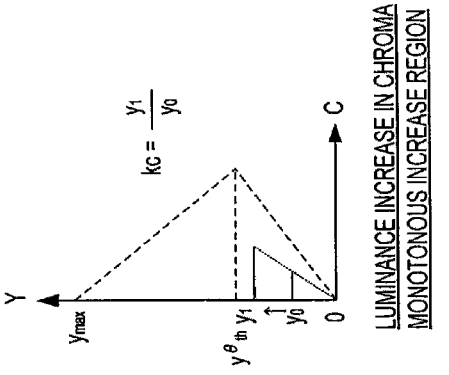
FIG. 6A LUMINANCE INCREASE IN CHROMA MONOTONOUS DECREASE REGION
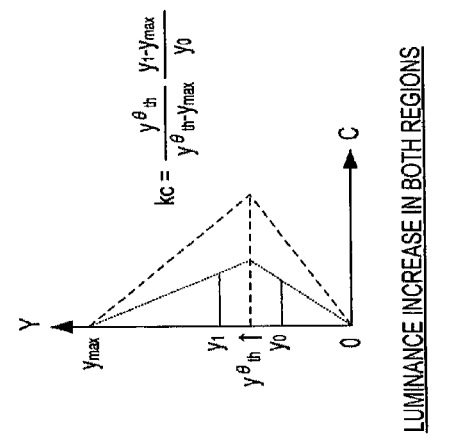
FIG. 6B LUMINANCE INCREASE IN BOTH REGIONS
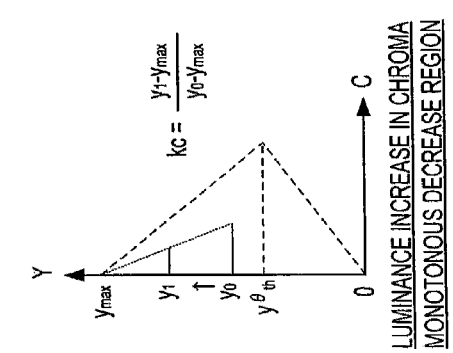
FIG. 6D LUMINANCE DECREASE IN CHROMA MONOTONOUS DECREASE REGION
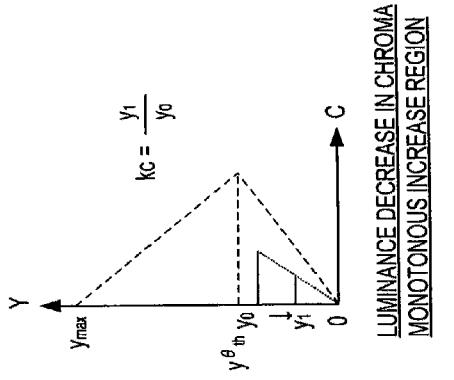
FIG. 6C LUMINANCE INCREASE IN CHROMA MONOTONOUS INCREASE REGION
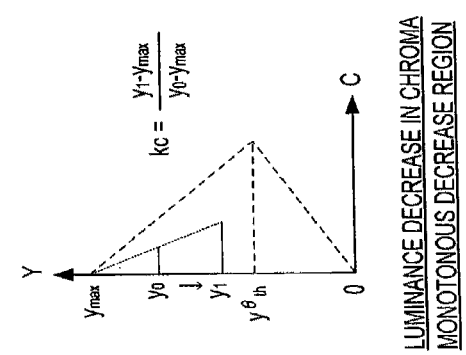
FIG. 6F LUMINANCE DECREASE IN CHROMA MONOTONOUS INCREASE REGION

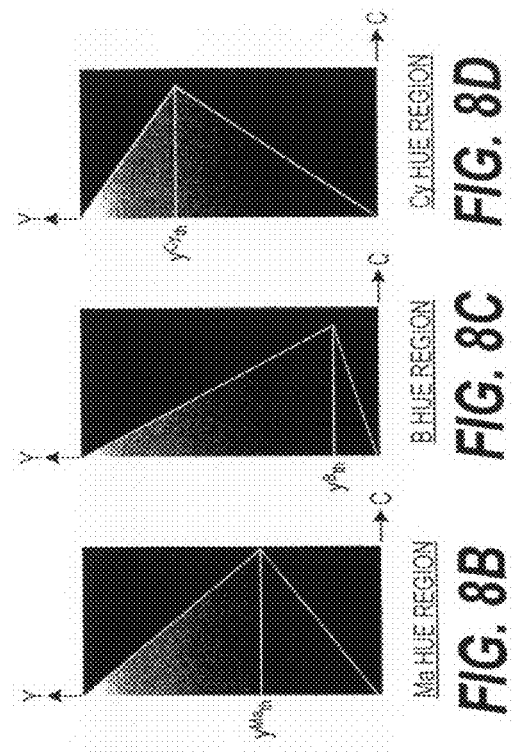
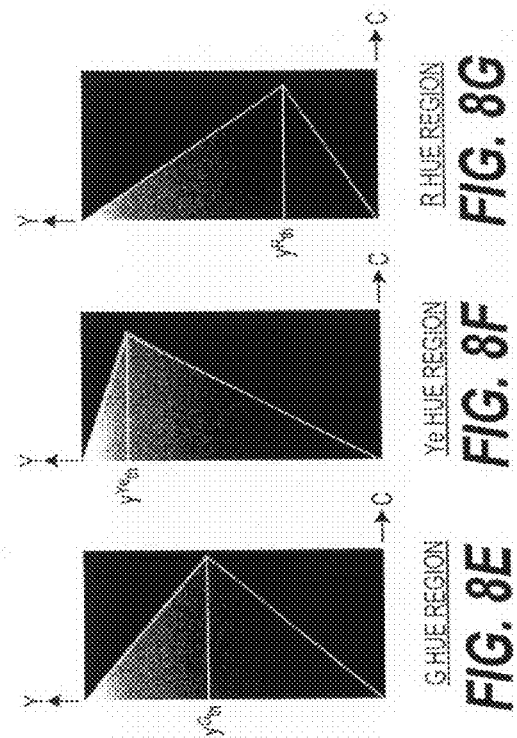
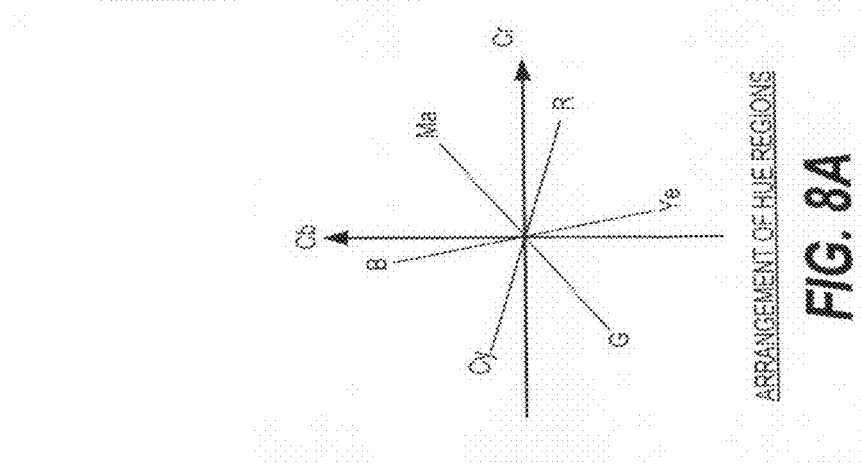
FIG. 8B Ma HUE REGION
FIG. 8C B HUE REGION
FIG. 8D Cb HUE REGION
FIG. 8E G HUE REGION
FIG. 8F Ye HUE REGION
FIG. 8G R HUE REGION
FIG. 8A ARRANGEMENT OF HUE REGIONS

DIVISION INTO REGIONS

DISTANCES $d_1$ TO $d_4$ BETWEEN SUBJECT PIXEL AND FOUR NEARBY REGIONS

IMAGE PROCESSING APPARATUS, IMAGE PROCESSING PROGRAM, AND IMAGE PROCESSING METHOD

TECHNICAL FIELD OF THE INVENTION

This invention relates to tone conversion processing of a color image signal, and more particularly to image processing for correcting the chroma of a color signal in accordance with tone conversion processing of a luminance signal.

BACKGROUND OF THE INVENTION

In current imaging systems such as a digital still camera or a video camera, the use of a single-plate imaging device having a complementary color filter or a primary color filter on a front surface has become mainstream. A color image signal from the imaging device is subjected to white balance processing and interpolation processing, then subjected to edge enhancement processing, chroma enhancement processing, tone conversion processing, and so on, and then output. This processing may be performed directly on the color image signal from the imaging device, but normally the processing is performed after converting the color image signal into a separate color space to divide it into a luminance signal and a color signal. In this case, the color signal may become unnatural when only the luminance signal is modified through tone conversion processing and so on.

In response to the problem of unnaturalness in the color signal, JP2004-312467A discloses a method of correcting the chroma of the color signal when the luminance signal is modified such that a ratio thereof relative to a maximum chroma value of the color space becomes fixed.

Further, JP3-127278A discloses a method of achieving natural imaging in computer graphics by determining a ratio between an original luminance signal and a corrected luminance signal, and using the result as a correction coefficient that is multiplied by a color signal.

Further, JP2003-69846A discloses a method of correcting color cast by dividing a color space into a plurality of hue regions and determining the hue region to which an image signal belongs in pixel units. A pixel having a high possibility of color cast is then determined by multiplying the pixel by a weighting factor from 0 to 1 on the basis of a different function for each hue region, whereupon a color cast correction coefficient is determined from the determined pixel.

SUMMARY OF THE INVENTION

With the method of JP2004-312467A, in which the chroma is corrected such that a ratio thereof relative to the maximum chroma value of the color space becomes fixed, natural color imaging is obtained. However, the calculation load is large and a large amount of processing time is required, leading to an increase in overall cost.

Further, in JP3-127278A, a magnitude relationship between the original luminance signal and the corrected luminance signal is determined such that the corrected color signal does not depart from the color space, and control is performed such that the correction coefficient is between 0 and 1. As a result, the chroma of the color signal can only be corrected in a weakening direction, and therefore appropriate chroma correction cannot be implemented.

Further, in JP2003-69846A, a form corresponding to the maximum chroma value of the color space is functionalized to determine a pixel having a high possibility of color cast. However, the function is normalized such that the weighting factor is between 0 and 1, and therefore the maximum chroma value of a color space in which the original form of each hue is different cannot be utilized appropriately. Furthermore, the calculation load is large and a large amount of processing time is required, leading to an increase in overall cost.

It is an object of this invention to provide image processing that obtains a high-quality color image signal by appropriately correcting the chroma of a color signal when a luminance signal is modified during tone conversion processing and the like. It is another object of this invention to increase the speed and reduce the cost of the image processing by simplifying a method of correcting the chroma of the color signal.

According to the image processing of this invention, a color image signal is converted into a luminance signal and a color signal in a predetermined color space, and tone conversion processing is performed on the luminance signal on the basis of a predetermined tone conversion characteristic. A function for chroma correction processing is then set using the luminance signal, the tone conversion-processed luminance signal, a maximum value of the luminance signal in the color space, and a luminance value when a maximum chroma is indicated in a hue region to which the color image signal belongs, as parameters, whereupon chroma correction processing is performed on the color signal using the luminance signal, the tone conversion-processed luminance signal, and the function.

BRIEF DESCRIPTION OF THE DRAWINGS

FIG. 2 is an illustrative view relating to a Bayer-type primary color filter.

FIGS. 5A to 5E are illustrative views relating to hue regions in a YCbCr color space.

FIGS. 6A to 6F are illustrative views relating to functions.

FIGS. 8A to 8G are illustrative views relating to hue regions in a YCbCr color space according to another aspect.

DESCRIPTION OF THE PREFERRED
EMBODIMENTS

Embodiments of this invention will be described below with reference to the attached figures.

Figure 1:
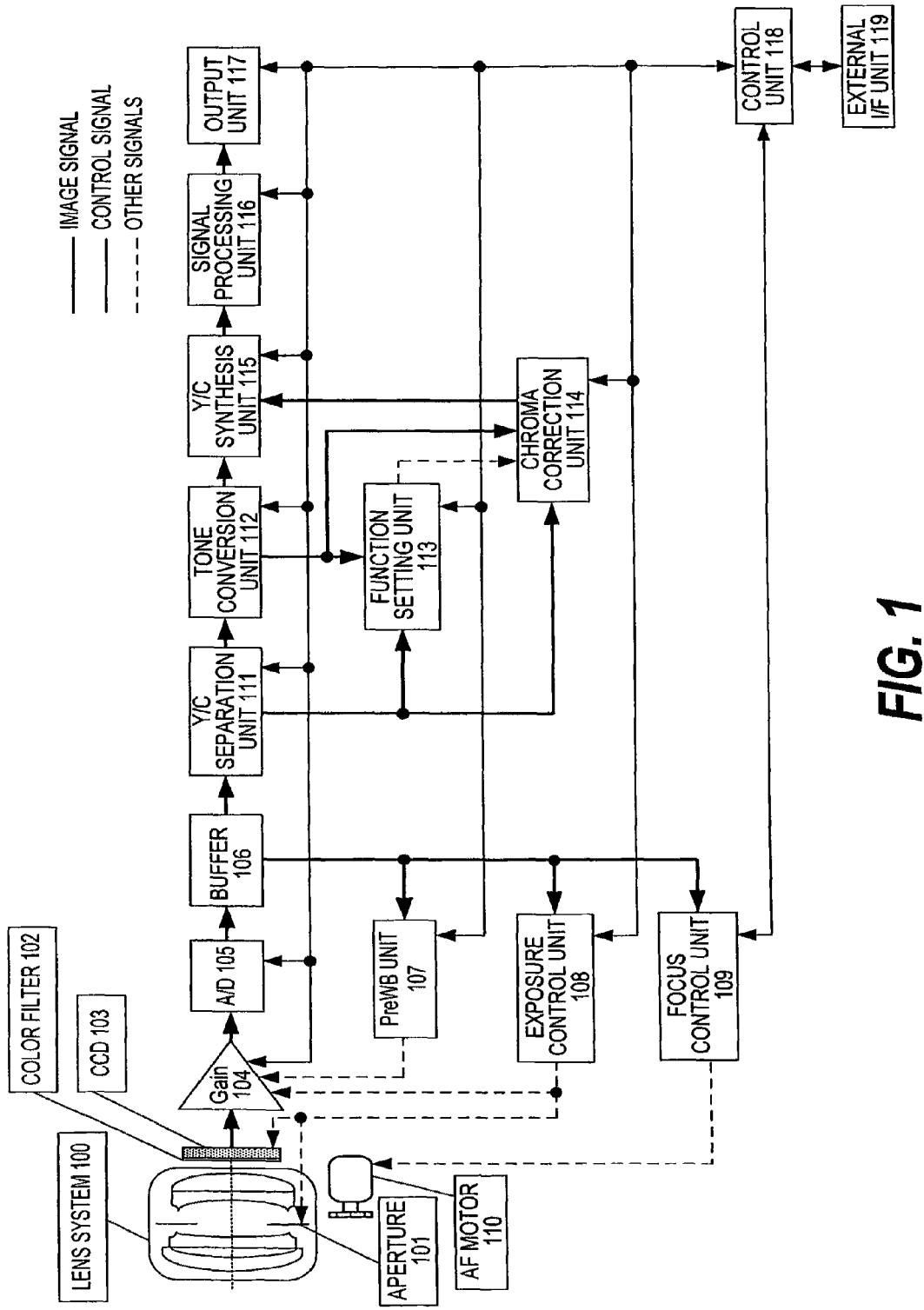
FIG. 1 is a constitutional diagram of a first embodiment of this invention.

First, the constitution of this invention will be described. FIG. 1 is a constitutional diagram of a first embodiment. A color image signal captured via a lens system 100, an aperture 101, a color filter 102, and a CCD 103 is amplified by an amplifier ("Gain" in the figure) 104, and converted into a digital signal by an A/D converter ("A/D" in the figure) 105. The color image signal output from the A/D converter 105 is transferred to a Y/C separation unit 111 via a buffer 106.

The buffer 106 is connected to a pre-white balance adjustment unit ("PreWB unit" in the figure) 107, an exposure control unit 108, and a focus control unit 109. The pre-white balance adjustment unit 107 is connected to the amplifier 104, the exposure control unit 108 is connected to the aperture 101, CCD 103, and amplifier 104, and the focus control unit 109 is connected to an AF motor 110. The Y/C separation unit 111 is connected to a tone conversion unit 112, a function setting unit 113, and a chroma correction unit 114. The tone conversion unit 112 is connected to the function setting unit 113, the chroma correction unit 114, and a Y/C synthesis unit 115. The function setting unit 113 is connected to the chroma correction unit 114, and the chroma correction unit 114 is connected to the Y/C synthesis unit 115. The Y/C synthesis unit 115 is connected to an output unit 117 such as a memory card via a signal processing unit 116.

A control unit 118 such as a microcomputer is connected bilaterally to the amplifier 104, A/D converter 105, pre-white balance adjustment unit 107, exposure control unit 108, focus control unit 109, Y/C separation unit 111, tone conversion unit 112, function setting unit 113, chroma correction unit 114, Y/C synthesis unit 115, signal processing unit 116, and output unit 117.

An external I/F unit 119 comprising a power switch, a shutter button, and an interface for performing setting to switch between various types of photographic modes is also connected bilaterally to the control unit 118.

Next, the content of signal processing will be described.

The flow of the color image signal will be described with reference to FIG. 1. After setting photographic conditions such as the ISO sensitivity via the external I/F unit 119, a pre-shooting mode is entered by half-pressing the shutter button. The color image signal captured via the lens system 100, aperture 101, color filter 102, and CCD 103 is output as an analog signal. In this embodiment, the CCD 103 is a single CCD in which a Bayer-type primary color filter is disposed on a front surface as the color filter 102. FIG. 2 shows the constitution of a Bayer-type primary color filter. In a Bayer-type filter, a basic unit is constituted by 2×2 pixels, and two green (G) filter pixels, one red (R) filter pixel, and one blue (B) filter pixel are disposed in each basic unit.

The aforementioned analog signal is amplified by a predetermined amount in the amplifier 104, converted into a digital signal by the A/D converter 105, and transferred to the buffer 106. In this embodiment, the tone width of the digitized color image signal is set at 12 bits, for example.

The color image signal in the buffer 106 is transferred to the pre-white balance adjustment unit 107, the exposure control unit 108, and the focus control unit 109. The pre-white balance adjustment unit 107 calculates a simple white balance coefficient by integrating signals of a predetermined level in each color signal, transfers the coefficient to the amplifier 104, and adjusts the white balance by multiplying the coefficient by a different gain for each color signal.

The exposure control unit 108 controls the aperture 101, the electronic shutter speed of the CCD 103, the amplification factor of the amplifier 104, and so on, taking into consideration the set ISO sensitivity, the shutter speed of the limit of image stability, and so on, to obtain appropriate exposure.

The focus control unit 109 obtains a focusing signal by detecting the edge strength of the color image signal and controlling the A/F motor 110 to maximize the detected edge strength.

Next, real shooting is performed by fully pressing the shutter button via the external I/F unit 119, whereby an image signal is transferred to the buffer 106, similarly to pre-shooting. Real shooting is performed on the basis of the white balance coefficient determined by the pre-white balance adjustment unit 107, exposure information determined by the exposure control unit 108, and focus information determined by the focus control unit 109. These photographic conditions are transferred to the control unit 118.

The image signal in the buffer 106 is transferred to the Y/C separation unit 111. The Y/C separation unit 111 generates a color image signal constituted by three plates, namely R, G, and B, by means of well-known interpolation processing on the basis of the control performed by the control unit 118, and calculates a luminance signal Y and color signals Cb, Cr on the basis of Equation (1).

$$Y = 0.29900R + 0.58700G + 0.11400B$$

$$Cb = -0.16874R - 0.33126G + 0.50000B$$

$$Cr = 0.50000R - 0.41869G - 0.08131B \quad (1)$$

The luminance signal Y and the color signals Cb, Cr are transferred to the tone conversion unit 112, the function setting unit 113, and the chroma correction unit 114. The tone conversion unit 112 calculates a tone conversion characteristic for use in tone conversion processing on the basis of the control performed by the control unit 118, and then performs tone conversion processing on the luminance signal Y. A luminance signal Y' following tone conversion processing is transferred to the function setting unit 113, the chroma correction unit 114, and the Y/C synthesis unit 115.

On the basis of the control performed by the control unit 118, the function setting unit 113 sets a function to be used in chroma correction processing of the color signals in pixel units, based on the luminance signal Y and the color signals Cb, Cr from the Y/C separation unit 111 and the tone conversion-processed luminance signal Y' from the tone conversion unit 112. The set functions are transferred to the chroma correction unit 114.

On the basis of the control performed by the control unit 118, the chroma correction unit 114 calculates a chroma correction coefficient kc to be used in chroma correction processing in pixel units, based on the luminance signal Y from the Y/C separation unit 111, the tone conversion-processed luminance signal Y' from the tone conversion unit 112, and the functions from the function setting unit 113. The chroma correction unit 114 then performs chroma correction processing by multiplying the chroma correction coefficient kc by the color signals Cb, Cr. Chroma correction-processed color signals Cb', Cr' are then transferred to the Y/C synthesis unit 115.

The processing of the function setting unit 113 and chroma correction unit 114 described above is performed synchronously in pixel units on the basis of the control performed by the control unit 118.

On the basis of the control performed by the control unit 118, the Y/C synthesis unit 115 synthesizes the tone conversion-processed luminance signal Y' from the tone conversion unit 112 and the chroma correction-processed color signals Cb', Cr' from the chroma correction unit 114 into tone-converted color image signals R', G', B' on the basis of Equation (2).

$$R' = Y' + 1.40200 Cr'$$

$$G' = Y' - 0.34414 Cb' - 0.71414 Cr'$$

$$B' = Y' + 1.77200 Cb' \quad (2)$$

The synthesized color image signals are then transferred to the signal processing unit 116. The signal processing unit 116 performs well-known compression processing and the like, and then transfers the signal-processed color image signals to the output unit 117. The output unit 117 records and stores the color image signals on a recording medium such as a memory card.

Figure 3:
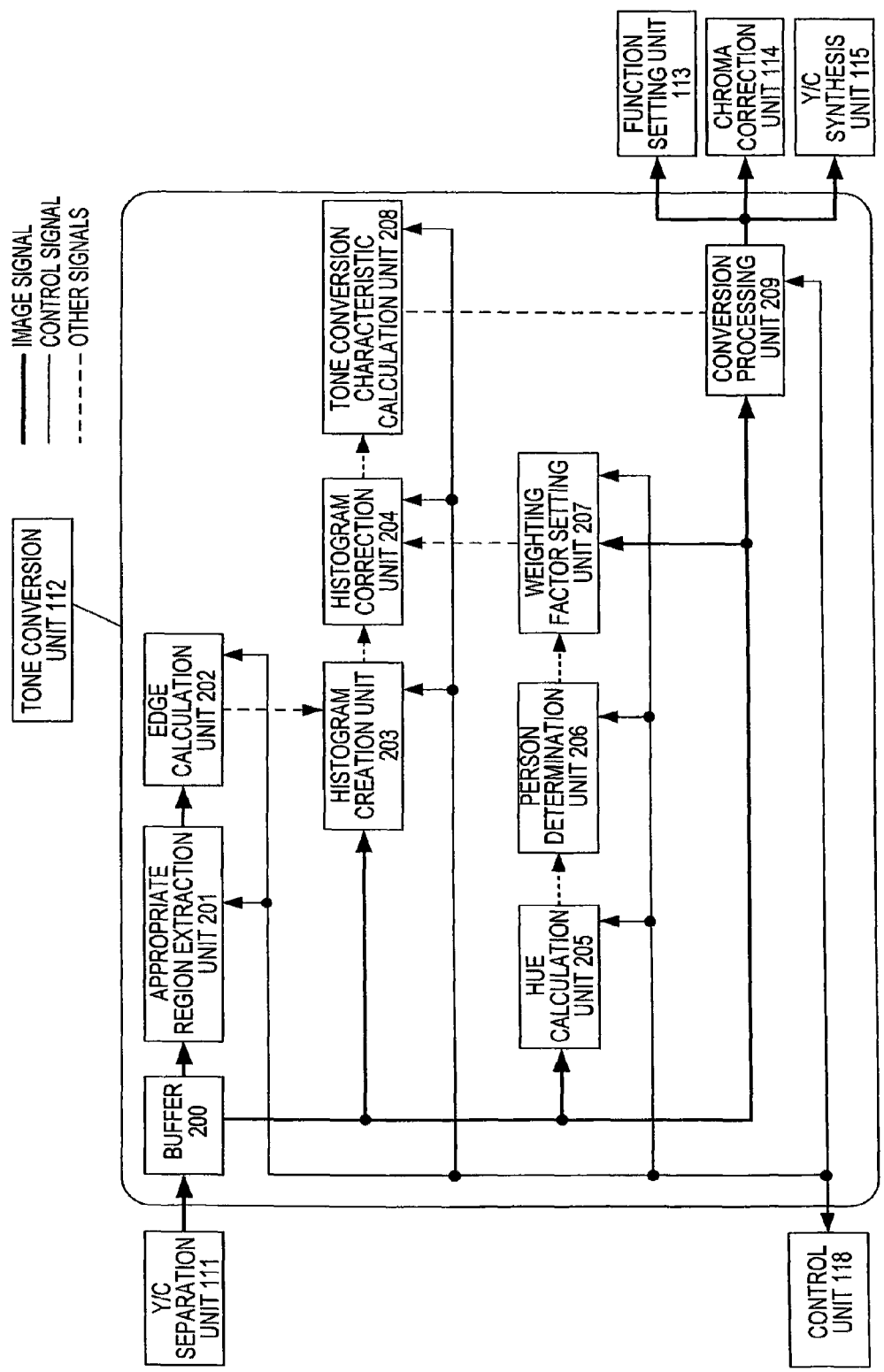
FIG. 3 is a constitutional diagram of a tone conversion unit.

FIG. 3 shows an example of the constitution of the tone conversion unit 112. The tone conversion unit 112 is constituted by a buffer 200, an appropriate region extraction unit 201, an edge calculation unit 202, a histogram creation unit 203, a histogram correction unit 204, a hue calculation unit 205, a person determination unit 206, a weighting factor setting unit 207, a tone conversion characteristic calculation unit 208, and a conversion processing unit 209.

The Y/C separation unit 111 is connected to the appropriate region extraction unit 201, the histogram creation unit 203, the hue calculation unit 205, the weighting factor setting unit 207, and the conversion processing unit 209 via the buffer 200. The appropriate region extraction unit 201 is connected to the histogram creation unit 203 via the edge calculation unit 202. The histogram creation unit 203 is connected to the conversion processing unit 209 via the histogram correction unit 204 and the tone conversion characteristic calculation unit 208. The hue calculation unit 205 is connected to the histogram correction unit 204 via the person determination unit 206 and the weighting factor setting unit 207. The conversion processing unit 209 is connected to the function setting unit 113, the chroma correction unit 114, and the Y/C synthesis unit 115. The control unit 118 is connected bilaterally to the appropriate region extraction unit 201, edge calculation unit 202, histogram creation unit 203, histogram correction unit 204, hue calculation unit 205, person determination unit 206, weighting factor setting unit 207, tone conversion characteristic calculation unit 208, and conversion processing unit 209.

The luminance signal Y and color signals Cb, Cr from the Y/C separation unit 111 are recorded in the buffer 200. On the basis of the control performed by the control unit 118, the appropriate region extraction unit 201 reads the luminance signal Y from the buffer 200, and compares it with predetermined thresholds relating to a dark portion and a light portion (with a 12 bit tone, the dark portion is 128 and the light portion is 3968, for example). The appropriate region extraction unit 201 then transfers a luminance signal Y that is equal to or higher than the dark portion threshold and equal to or lower than the light portion threshold to the edge calculation unit 202 as an appropriate exposure region.

On the basis of the control performed by the control unit 118, the edge calculation unit 202 reads the appropriate exposure region luminance signal Y from the appropriate region extraction unit 201, and performs well-known edge strength calculation processing using a Laplacian filter or the like. The calculated edge strength is transferred to the histogram creation unit 203.

On the basis of the control performed by the control unit 118, the histogram creation unit 203 selects a pixel having an edge strength that is equal to or higher than a predetermined threshold (64 in the case of a 12 bit tone, for example) in relation to the edge strength from the edge calculation unit 202, and reads the luminance signal Y in a corresponding pixel position from the buffer 200. The histogram creation unit 203 then creates a histogram in relation to the read luminance signal Y, and transfers the created histogram to the histogram correction unit 204.

Meanwhile, on the basis of the control performed by the control unit 118, the hue calculation unit 205 reads the color signals Cb, Cr from the buffer 200, extracts a skin color region by comparing the color signals Cb, Cr with a predetermined threshold, and transfers the result to the person determination unit 206. On the basis of the control performed by the control unit 118, the person determination unit 206 extracts a region determined to be the face of a person based on the skin color region information from the hue calculation unit 205, and transfers the result to the weighting factor setting unit 207.

On the basis of the control performed by the control unit 118, the weighting factor setting unit 207 determines a luminance signal Y within the region determined to be the face of a person from the buffer 200 based on the skin color region information from the hue calculation unit 205. The weighting factor setting unit 207 then multiplies the luminance signal Y within the region determined to be the face of a person by a predetermined coefficient to calculate a correction weighting factor relating to each luminance level. In relation to a luminance level not existing within the region determined to be the face of a person, the weighting factor is set at 0.

The calculated weighting factor is transferred to the histogram correction unit 204. On the basis of the control performed by the control unit 118, the histogram correction unit 204 reads the histogram from the histogram creation unit 203, reads the weighting factor from the weighting factor setting unit 207, and performs correction by adding the weighting factor to each luminance level of the histogram. The corrected histogram is then transferred to the tone conversion characteristic calculation unit 208.

On the basis of the control performed by the control unit 118, the tone conversion characteristic calculation unit 208 accumulates the histograms from the histogram correction unit 204, and calculates a tone conversion characteristic by normalizing the accumulated histograms. Normalization is performed in accordance with the tones of the image signal such that with 12 bits, normalization is performed within a range of 0 to 4095, for example. The tone conversion characteristic is then transferred to the conversion processing unit 209.

On the basis of the control performed by the control unit 118, the conversion processing unit 209 performs tone conversion processing on the luminance signal from the buffer 200 using the tone conversion characteristic from the tone conversion characteristic calculation unit 208. The luminance signal following tone conversion processing is transferred to the function setting unit 113, the chroma correction unit 114, and the Y/C synthesis unit 115.

Figure 4:
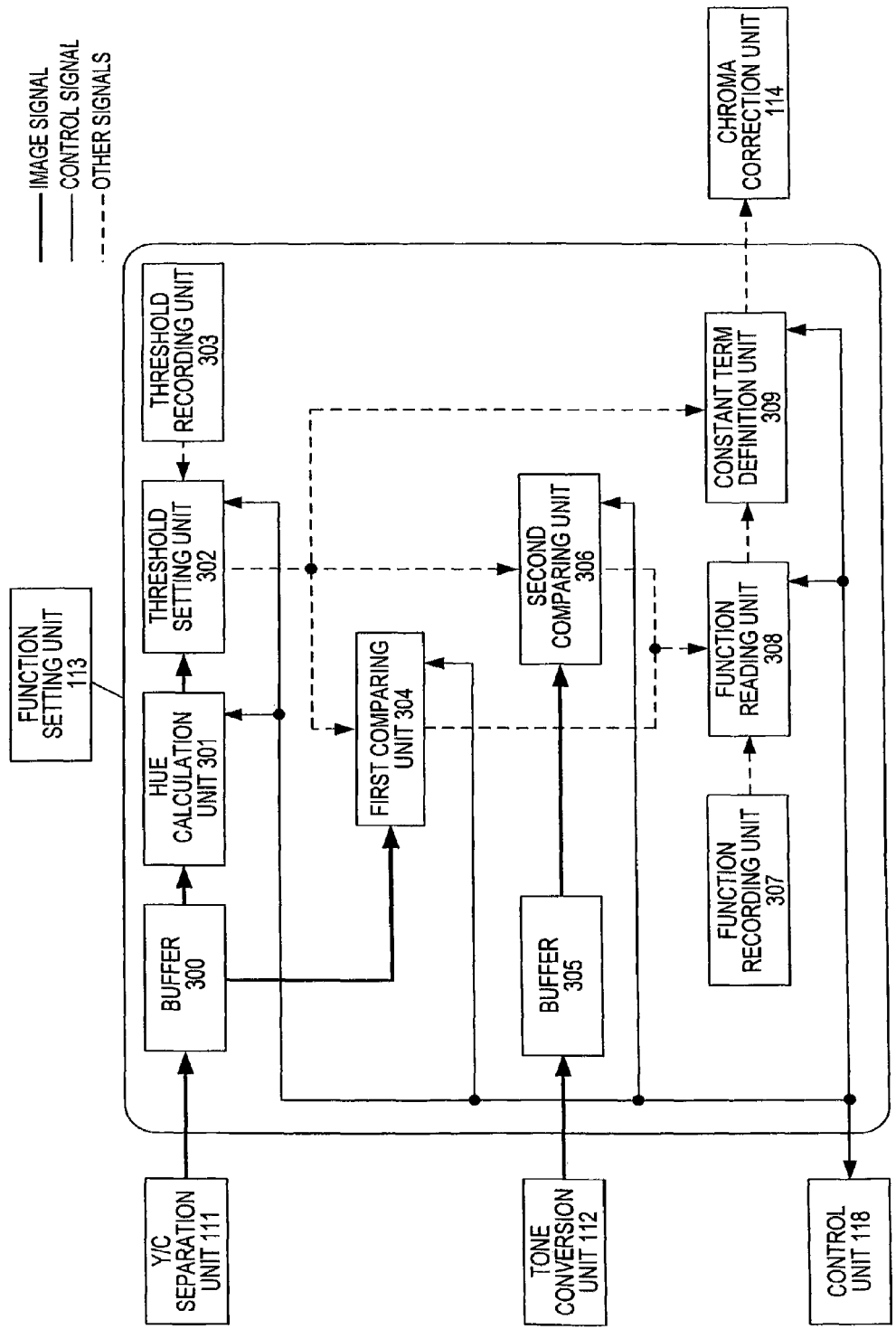
FIG. 4 is a constitutional diagram of a function setting unit.

FIG. 4 shows an example of the constitution of the function setting unit 113. The function setting unit 113 is constituted by a buffer 300, a hue calculation unit 301, a threshold setting unit 302, a threshold recording unit 303, a first comparing unit 304, a buffer 305, a second comparing unit 306, a function recording unit 307, a function reading unit 308, and a constant term definition unit 309.

The Y/C separation unit 111 is connected to the hue calculation unit 301 and the first comparing unit 304 via the buffer 300. The tone conversion unit 112 is connected to the second comparing unit 306 via the buffer 305. The hue calculation unit 301 and threshold recording unit 303 are connected to the threshold setting unit 302. The threshold setting unit 302 is connected to the first comparing unit 304, second comparing unit 306, and constant term definition unit 309. The first comparing unit 304, second comparing unit 306, and function recording unit 307 are connected to the function reading unit 308. The function reading unit 308 is connected to the constant term definition unit 309. The constant term definition unit 309 is connected to the chroma correction unit 114. The control unit 118 is connected bilaterally to the hue calculation unit 301, threshold setting unit 302, first comparing unit 304, second comparing unit 306, function reading unit 308, and constant term definition unit 309.

The luminance signal Y and color signals Cb, Cr from the Y/C separation unit 111 are recorded in the buffer 300. Further, the tone-processed luminance signal Y' from the tone conversion unit 112 is recorded in the buffer 305. On the basis of the control performed by the control unit 118, the hue calculation unit 301 reads the color signals Cb, Cr sequentially in pixel units from the buffer 300, and determines hue information in each pixel.

In this embodiment, the four hue regions shown in FIG. 5A are envisaged as the hue information. FIG. 5A shows four hue regions in a CrCb plane, namely a hue region of no less than 0° and less than 90° (to be referred to hereafter as a "45° hue region"), a hue region of no less than 90° and less than 180° (to be referred to hereafter as a "135° hue region"), a hue region of no less than 180° and less than 270° (to be referred to hereafter as a "225° hue region"), and a hue region of no less than 270° and less than 360° (to be referred to hereafter as a "315° hue region").

The hue calculation unit 301 performs classification into the four hue regions on the basis of the sign (positive/negative) of the color signals Cb, Cr as shown in Table 1.

TABLE 1

METHOD OF CLASSIFICATION INTO FOUR HUE REGIONS

| Cb | Cr | hue region |
| --- | --- | --- |
| positive or zero | positive | 45° hue region |
| positive | negative or zero | 135° hue region |
| negative or zero | negative | 225° hue region |
| negative | positive or zero | 315° hue region |

The results of classification into the four hue regions are transferred to the threshold setting unit 302 as the hue information. On the basis of the control performed by the control unit 118, the threshold setting unit 302 sets a threshold $y^\theta_{th}$ corresponding to the four hue regions in pixel units. Here, $\theta=45, 135, 225, 315$, and therefore signifies the four hue regions.

FIGS. 5B to 5E show the 45°, 135°, 225°, and 315° hue regions. The abscissa shows the chroma C, and the ordinate shows the luminance Y, and it is assumed that the chroma C and the luminance Y have this relationship in the same hue region. The threshold $y^\theta_{th}$ indicates the value of the luminance signal at which the chroma C reaches a maximum in the same hue region.

At or above the threshold $y^\theta_{th}$, the chroma decreases monotonously as the luminance increases (to be referred to hereafter as a "chroma monotonous decrease region"), and at or below the threshold $y^\theta_{th}$, the chroma increases monotonously as the luminance increases (to be referred to hereafter as a "chroma monotonous increase region"). The threshold $y^\theta_{th}$ is defined by determining the color space and the hue region.

The threshold recording unit 303 records the threshold $y^\theta_{th}$, which is determined in advance. The threshold setting unit 302 reads the corresponding threshold $y^\theta_{th}$ from the threshold recording unit 303 on the basis of the hue information from the hue calculation unit 301, and transfers the read threshold $y^\theta_{th}$ to the first comparing unit 304, second comparing unit 306, and constant term definition unit 309.

On the basis of the control performed by the control unit 118, the first comparing unit 304 reads a luminance signal $y_0$ having identical coordinates to the color signal used by the hue calculation unit 301 from the buffer 300, and compares the luminance signal $y_0$ with the threshold $y^\theta_{th}$ from the threshold setting unit 302. The comparison is performed to determine whether the luminance signal $y_0$ belongs to the chroma monotonous decrease region or the chroma monotonous increase region. The result of the comparison is transferred to the function reading unit 308.

Meanwhile, on the basis of the control performed by the control unit 118, the second comparing unit 306 reads a tone conversion-processed luminance signal $y_1$ having identical coordinates to the color signal used by the hue calculation unit 301 from the buffer 305, and compares the luminance signal $y_1$ with the threshold $y^\theta_{th}$ from the threshold setting unit 302. The comparison is performed to determine whether the tone conversion-processed luminance signal $y_1$ belongs to the chroma monotonous decrease region or the chroma monotonous increase region. The result of the comparison is transferred to the function reading unit 308.

On the basis of the control performed by the control unit 118, the function reading unit 308 uses the comparison results from the first comparing unit 304 and second comparing unit 306 to set a function for calculating the chroma correction coefficient kc to be used in chroma correction processing of the color signal.

FIGS. 6A to 6F show this function relating to six cases. The six cases are constituted by three cases, namely a case in which the luminance signal $y_0$ and the tone conversion-processed luminance signal $y_1$ both belong to the chroma monotonous increase region, a case in which both belong to the chroma monotonous decrease region, and a case in which one belongs to the chroma monotonous increase region and one belongs to the chroma monotonous decrease region, in two combinations, namely when the luminance signal increases as a result of tone conversion processing and when the luminance signal decreases as a result of tone conversion processing.

FIGS. 6A to 6C show the cases in which the luminance signal increases as a result of tone conversion processing, while FIGS. 6D to 6F show the cases in which the luminance signal decreases as a result of tone conversion processing. Further, FIGS. 6A and 6D show the cases in which the luminance signal $y_0$ and the tone conversion-processed luminance signal $y_1$ both belong to the chroma monotonous increase region, FIGS. 6B and 6E show the cases in which one belongs to the chroma monotonous increase region and one belongs to the chroma monotonous decrease region, and FIGS. 6C and 6F show the cases in which both belong to the chroma monotonous decrease region.

The four functions for calculating the chroma correction coefficient kc in the six cases described above are summarized in Table 2.

TABLE 2

METHOD OF CLASSIFICATION INTO FOUR FUNCTIONS AND CONSTANT TERMS OF FUNCTIONS

| luminance signal $y_0$ | luminance signal $y_1$ | function | constant terms |
|---|---|---|---|
| chroma monotonous increase region | chroma monotonous increase region | $\dfrac{y_1}{y_0}$ | $a = 1, b = 0, c = 1, d = 0$ |
| chroma monotonous increase region | chroma monotonous decrease region | $\dfrac{y_{th}^\theta - y_{max}}{y_{th}^\theta} \cdot \dfrac{y_1}{y_0 - y_{max}}$ | $a = \dfrac{y_{th}^\theta - y_{max}}{y_{th}^\theta}, b = 0, c = 1, d = y_{max}$ |
| chroma monotonous decrease region | chroma monotonous increase region | $\dfrac{y_{th}^\theta}{y_{th}^\theta - y_{max}} \cdot \dfrac{y_1 - y_{max}}{y_0}$ | $a = 1, b = y_{max}, c = \dfrac{y_{th}^\theta}{y_{th}^\theta - y_{max}}, d = 0$ |
| chroma monotonous decrease region | chroma monotonous decrease region | $\dfrac{y_1 - y_{max}}{y_0 - y_{max}}$ | $a = 1, b = y_{max}, c = 1, d = y_{max}$ |

These four functions have the luminance signals $y_0$, $y_1$ before and after tone conversion processing, a maximum value $y_{max}$ of the luminance signal in the color space, and the luminance value $y^\theta_{th}$ when maximum chroma is indicated in the hue region to which the color image signal belongs as parameters, and are set such that a ratio thereof to the maximum chroma value of the color space becomes constant. In other words, the four functions are set such that when the luminance signal in the hue region to which the color image signal belongs is modified from $y_0$ to $y_1$, the ratio between the maximum chroma that can be obtained with the luminance signal $y_0$ prior to tone conversion processing and the chroma prior to chroma correction processing becomes equal to the ratio between the maximum chroma that can be obtained with the luminance signal $y_1$ following tone conversion processing and the chroma following chroma correction processing.

The maximum value $y_{max}$ of the luminance signal in the color space is determined by the tone width of the color image signal. In this embodiment, the color space is envisaged as the YCbCr color space indicated by Equation (1) and 12 bits are envisaged as the tone width of the color image signal, so $y_{max} = 4095$. It should be noted that in the latter stage chroma correction unit 114, the input luminance signal $y_0$ is subjected to bit shift processing such that only higher order bits are extracted. Therefore, $y_{max}$ as used in actuality takes a smaller value than 4095 in accordance with this bit shift processing. Similarly, a value corresponding to bit shift processing is used as $y^\theta_{th}$.

Correcting the chroma such that the ratio thereof to the maximum chroma value of the color space becomes constant is a point that is shared with JP2004-312467A. In JP2004-312467A, however, the maximum chroma value of the color space must be calculated using a model of the maximum chroma value of the color space every time the chroma correction coefficient is calculated. In this embodiment, on the other hand, there is no need to calculate the maximum chroma value of the color space, and instead, the chroma correction coefficient kc is calculated using four simple functions constituted by the constant terms $y_{max}$ and $y^\theta_{th}$ and the variables $y_0$, $y_1$. On this point, the two differ.

The function recording unit 307 records the four functions in advance. The function reading unit 308 reads corresponding functions such as those shown in Table 2 from the function recording unit 307 on the basis of the comparison results from the first comparing unit 304 and second comparing unit 306, or in other words the information indicating whether the values $y_0$, $y_1$ of the luminance signals before and after tone conversion processing belong to the chroma monotonous decrease region or the chroma monotonous increase region. The read functions are then transferred to the constant term definition unit 309.

On the basis of the control performed by the control unit 118, the constant term definition unit 309 defines the constant terms relating to the four functions.

Here, the four functions shown in Table 2 have $y_1/y_0$ as a basic form, and may be defined in a unified manner, as shown in Equation (3), by employing four constant terms a, b, c, d.

$$kc = a \cdot c \cdot \frac{y_1 - b}{y_0 - d} \quad (3)$$

The constant term definition unit 309 defines the four constant terms a, b, c, d corresponding to the functions from the function reading unit 308 as shown in Table 2. The defined constant terms a, b, c, d are transferred to the chroma correction unit 114.

The reason for defining the four constant terms a, b, c, d in the manner described above is because identical calculation processing is performed on the four functions in the latter stage chroma correction unit 114. When the chroma correction unit 114 performs four independent calculation processes in accordance with the four functions, for example, the need to define unused constant terms is eliminated.

Figure 7:
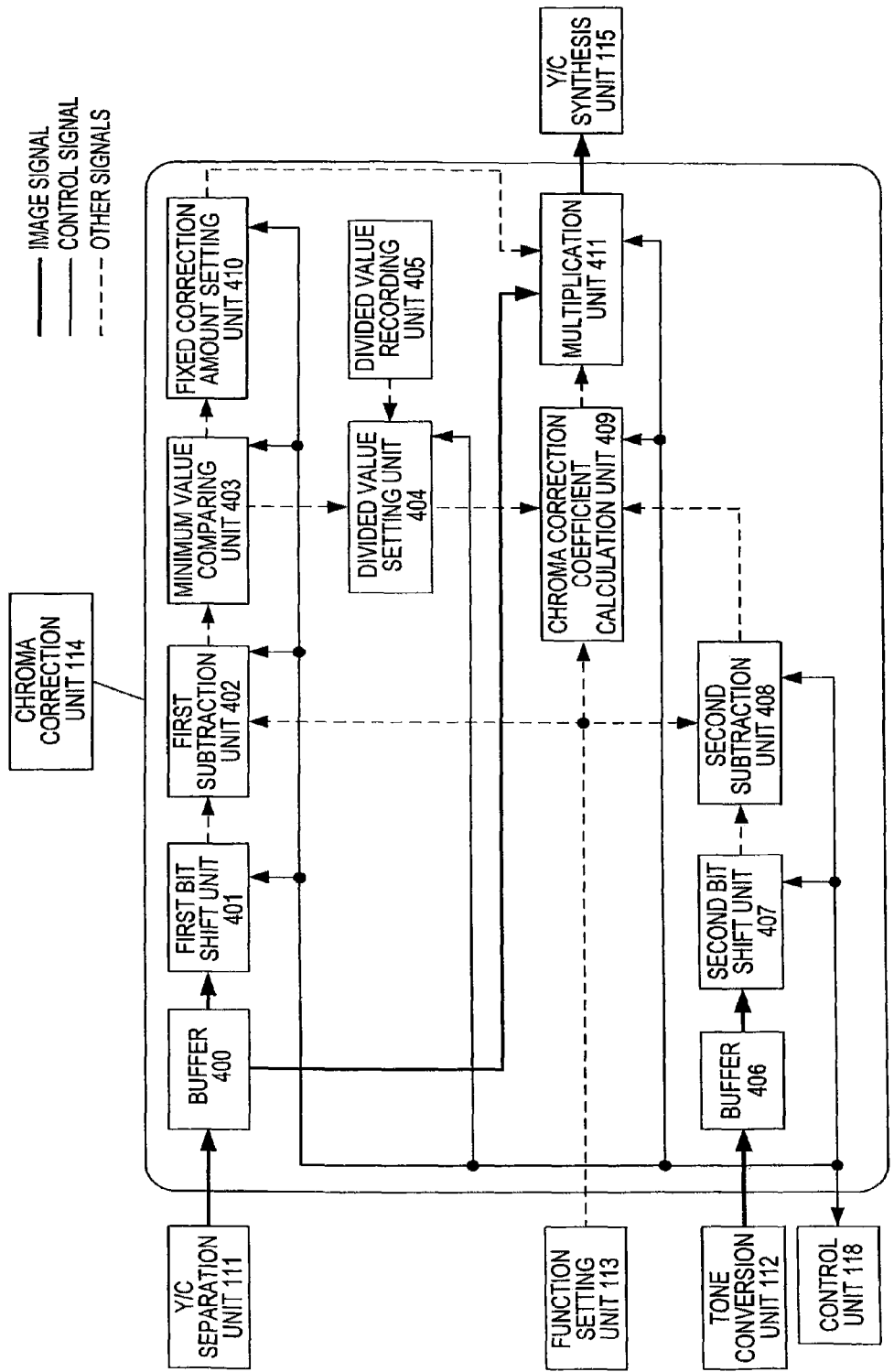
FIG. 7 is a constitutional diagram of a chroma correction unit.

FIG. 7 shows an example of the constitution of the chroma correction unit 114. The chroma correction unit 114 is constituted by a buffer 400, a first bit shift unit 401, a first subtraction unit 402, a minimum value comparing unit 403, a divided value setting unit 404, a divided value recording unit 405, a buffer 406, a second bit shift unit 407, a second subtraction unit 408, a chroma correction coefficient calculation unit 409, a fixed correction amount setting unit 410, and a multiplication unit 411.

The Y/C separation unit 111 is connected to the first bit shift unit 401 and the multiplication unit 411 via the buffer 400. The first bit shift unit 401 is connected to the divided value setting unit 404 and the fixed correction amount setting unit 410 via the first subtraction unit 402 and the minimum value comparing unit 403. The divided value recording unit 405 is connected to the divided value setting unit 404, and the divided value setting unit 404 is connected to the chroma correction coefficient calculation unit 409. The tone conversion unit 112 is connected to the chroma correction coefficient calculation unit 409 via the buffer 406, the second bit shift unit 407, and the second subtraction unit 408. The chroma correction coefficient calculation unit 409 and fixed correction amount setting unit 410 are connected to the multiplication unit 411. The function setting unit 113 is connected to the first subtraction unit 402, second subtraction unit 408, and chroma correction coefficient calculation unit 409. The multiplication unit 411 is connected to the Y/C synthesis unit 115.

The control unit 118 is connected bilaterally to the first bit shift unit 401, first subtraction unit 402, minimum value comparing unit 403, divided value setting unit 404, second bit shift unit 407, second subtraction unit 408, chroma correction coefficient calculation unit 409, fixed correction amount setting unit 410, and multiplication unit 411.

The luminance signal Y and color signals Cb, Cr from the Y/C separation unit 111 are recorded in the buffer 400. Further, the tone-processed luminance signal Y' from the tone conversion unit 112 is recorded in the buffer 406.

On the basis of the control performed by the control unit 118, the first bit shift unit 401 reads the values $y_0$ of the luminance signals in the subject pixels in sequence from the buffer 400, and extracts a higher order bit component thereof by performing bit shift processing of a predetermined bit length thereon. In this embodiment, 12 bits are envisaged as the tone width of the luminance signal, and therefore, by performing 6 bit shift processing, for example, values of the luminance signals corresponding to the higher order 6 bits are extracted. The values $y_0$ of the bit shift-processed luminance signals are transferred to the first subtraction unit 402.

Similarly, on the basis of the control performed by the control unit 118, the second bit shift unit 407 reads the values $y_1$ of the tone-processed luminance signals in the subject pixels in sequence from the buffer 406, and extracts the values of the luminance signals corresponding to the higher order 6 bits by performing shift processing of a predetermined bit length, in this embodiment 6 bits, thereon. The values $y_1$ of the bit shift-processed, tone-processed luminance signals are transferred to the second subtraction unit 408.

It should be noted that the pixels processed by the first bit shift unit 401 and second bit shift unit 407 are controlled to identical coordinates by the control unit 118.

The function setting unit 113 transfers the constant term d, the constant term b, and the constant terms a and c, shown in Equation (3), to the first subtraction unit 402, the second subtraction unit 408, and the chroma correction coefficient calculation unit 409, respectively.

On the basis of the control performed by the control unit 118, the first subtraction unit 402 performs subtraction processing between the value $y_0$ of the luminance signal from the first bit shift unit 401 and the constant term d from the function setting unit 113, and transfers "$y_0-d$" to the minimum value comparing unit 403.

On the basis of the control performed by the control unit 118, the minimum value comparing unit 403 determines the absolute value of "$y_0-d$", and compares this to a predetermined threshold. In this embodiment, a 6 bit signal is envisaged, and therefore 4, for example, is used as the threshold. When the absolute value of "$y_0-d$" is equal to or greater than the threshold on the basis of the comparison result with the threshold, "$y_0-d$" is transferred to the divided value setting unit 404. When the absolute value of "$y_0-d$" is smaller than the threshold, on the other hand, "$y_0-d$" is discarded, and subsequent processing is relegated to the fixed correction amount setting unit 410.

On the basis of the control performed by the control unit 118, the divided value setting unit 404 determines an inverse "$1/(y_0-d)$" of "$y_0-d$" from the minimum value comparing unit 403 using the divided value recording unit 405.

The divided value recording unit 405 is a table storing inverses and it records an inverse relating to a 6 bit signal in this embodiment. It should be noted that "$y_0-d$" may take a negative value, but such a case can be handled by determining the inverse from the divided value recording unit 405 using the absolute value thereof, and then converting the inverse into a negative number only when "$y_0-d$" is negative. The determined inverse "$1/(y_0-d)$" is transferred to the chroma correction coefficient calculation unit 409.

Meanwhile, on the basis of the control performed by the control unit 118, the second subtraction unit 408 performs subtraction processing between the value $y_1$ of the tone conversion-processed luminance signal from the second bit shift unit 407 and the constant term b from the function setting unit 113, and transfers "$y_1-b$" to the chroma correction coefficient calculation unit 409.

On the basis of the control performed by the control unit 118, the chroma correction coefficient calculation unit 409 calculates the chroma correction coefficient kc shown in Equation (3) through multiplication, based on "$1/(y_0-d)$" from the divided value setting unit 404, "$y_1-b$" from the second subtraction unit 408, and "a" and "c" from the function setting unit 113. The calculated chroma correction coefficient kc is transferred to the multiplication unit 411.

Further, when the absolute value of "$y_0-d$" is less than the threshold in the minimum value comparing unit 403, the fixed correction amount setting unit 410 sets the chroma correction coefficient kc at 1, and transfers the chroma correction coefficient kc to the multiplication unit 411. In this case, the processing performed in the divided value setting unit 404, second subtraction unit 408, and chroma correction coefficient calculation unit 409 is halted on the basis of the control performed by the control unit 118.

On the basis of the control performed by the control unit 118, the multiplication unit 411 reads the color signals Cb, Cr sequentially from the buffer 400 in pixel units, and multiplies the color signals Cb, Cr by the chroma correction coefficient kc to obtain chroma correction-processed color signals Cb', Cr'.

$$Cb'=kc \cdot Cb$$

$$Cr'=kc \cdot Cr \qquad (4)$$

Here, the color signals read by the multiplication unit 411 are controlled by the control unit 118 to the same coordinates as the pixels having the values of the luminance signals processed by the first bit shift unit 401 and second bit shift unit 407. The chroma correction-processed color signals Cb', Cr' are transferred to the Y/C synthesis unit 115.

Next, the effects of the above constitutions and processing will be described.

According to the constitution described above, the chroma of a color signal can be corrected appropriately in accordance with modification of the luminance signal accompanying tone conversion processing, and therefore a natural, high-quality color image signal with little visual unpleasantness is obtained. Further, chroma correction processing of the color signal is performed on the basis of functions, and therefore the chroma correction processing is simplified, enabling an increase in the speed and a reduction in the cost of the image processing apparatus.

Further, the tone conversion characteristic is determined adaptively from an edge histogram of the luminance signal, and therefore highly precise, appropriate tone conversion processing can be performed on various types of color image signals.

Furthermore, tone processing is performed so as to emphasize regions of interest such as people, and therefore a subjectively pleasing, high-quality color image signal is obtained.

Further, in chroma correction processing, an optimal function is selected from among the four functions on the basis of the original luminance signal, the tone conversion-processed luminance signal, and the hue information. The four functions are simple, enabling a reduction in the amount of memory required to record them and a corresponding reduction in the cost of the image processing apparatus.

Moreover, the latter stage calculation processing is performed after defining the constant terms of the functions, and therefore the speed of the calculations performed during chroma correction processing can be increased, enabling a reduction in the processing time.

Furthermore, the chroma correction coefficient is calculated on the basis of subtraction processing and multiplication processing after extracting a predetermined higher order bit component from the luminance signal and the tone conversion-processed luminance signal, enabling reductions in the processing time and the scale of the hardware.

Further, when the magnitude of a denominator term of the function is smaller than a predetermined threshold, the chroma correction coefficient is set at 1, and therefore the stability of the calculation processing improves, and a high-quality color image signal is obtained.

Further, the YCbCr color space is easy to convert, and therefore the image processing apparatus can be increased in speed and reduced in cost. The processed luminance signal and color signals are converted into the intended color image signal, and therefore compatibility with the subsequent processing systems is maintained, enabling combination with a wide variety of systems.

Further, a Bayer-type primary color filter is highly compatible with existing imaging systems, and can therefore be combined with a wide variety of systems.

In the embodiment described above, four hue regions are used by the hue calculation unit 301 in the function setting unit 113, but the number of hue regions is not limited thereto. For example, an improvement in precision can be achieved by increasing the number of hue regions to 8 or 16. Moreover, the hue regions may be divided using specific hues rather than being divided evenly in an angular direction.

FIGS. 8A to 8G show examples of six hues, namely R (red), G (green), B (blue), Cy (cyan), Mg (magenta), and Ye (yellow). FIG. 8A shows an arrangement of the R, G, B, Cy, Mg, and Ye hue regions in the CrCb plane. FIGS. 8B to 8G show the R, G, B, Cy, Mg, and Ye hue regions and the threshold $y^θ_{th}$. In this case, $θ$=R, G, B, Cy, Mg, Ye. In addition, important hue regions such as skin color may be used as stored colors.

Furthermore, in the embodiment described above, a YCbCr color space is used as the color space, but this invention does not have to be limited to this constitution, and various color spaces, such as a color space that can be converted by linear calculation, for example a YIQ color space, may be used instead. When a YIQ color space is used, the Y/C separation unit 111 determines the luminance signal Y and the color signals IQ using the following equation.

$Y=0.29900R+0.58700G+0.11400B$ $I=0.59600R-0.27400G-0.32200B$ $Q=0.21100R-0.52200G-0.31100B$ (5)

Further, the Y/C synthesis unit 115 synthesizes color image signals R', G', B' in relation to the tone conversion-processed luminance signal Y' and chroma correction-processed color signals I', Q' from the chroma correction unit 114 using the following equation.

$R'=Y'+0.95600I'+0.62100Q'$ $G'=Y'-0.27300I'-0.64700Q'$ $B'=Y'-1.10700I'+1.70400Q'$ (6)

Furthermore, in the embodiment described above, a single color image signal was described, but the processing described above may be applied similarly to a plurality of color image signals captured chronologically.

In the embodiment described above, a constitution is integrated with an imaging unit constituted by the lens system 100, aperture 101, color filter 102, CCD 103, amplifier 104, A/D converter 105, pre-white balance adjustment unit 107, exposure control unit 108, focus control unit 109, and AF motor 110 was described, but this invention does not have to be limited to such a constitution.

Figure 9:
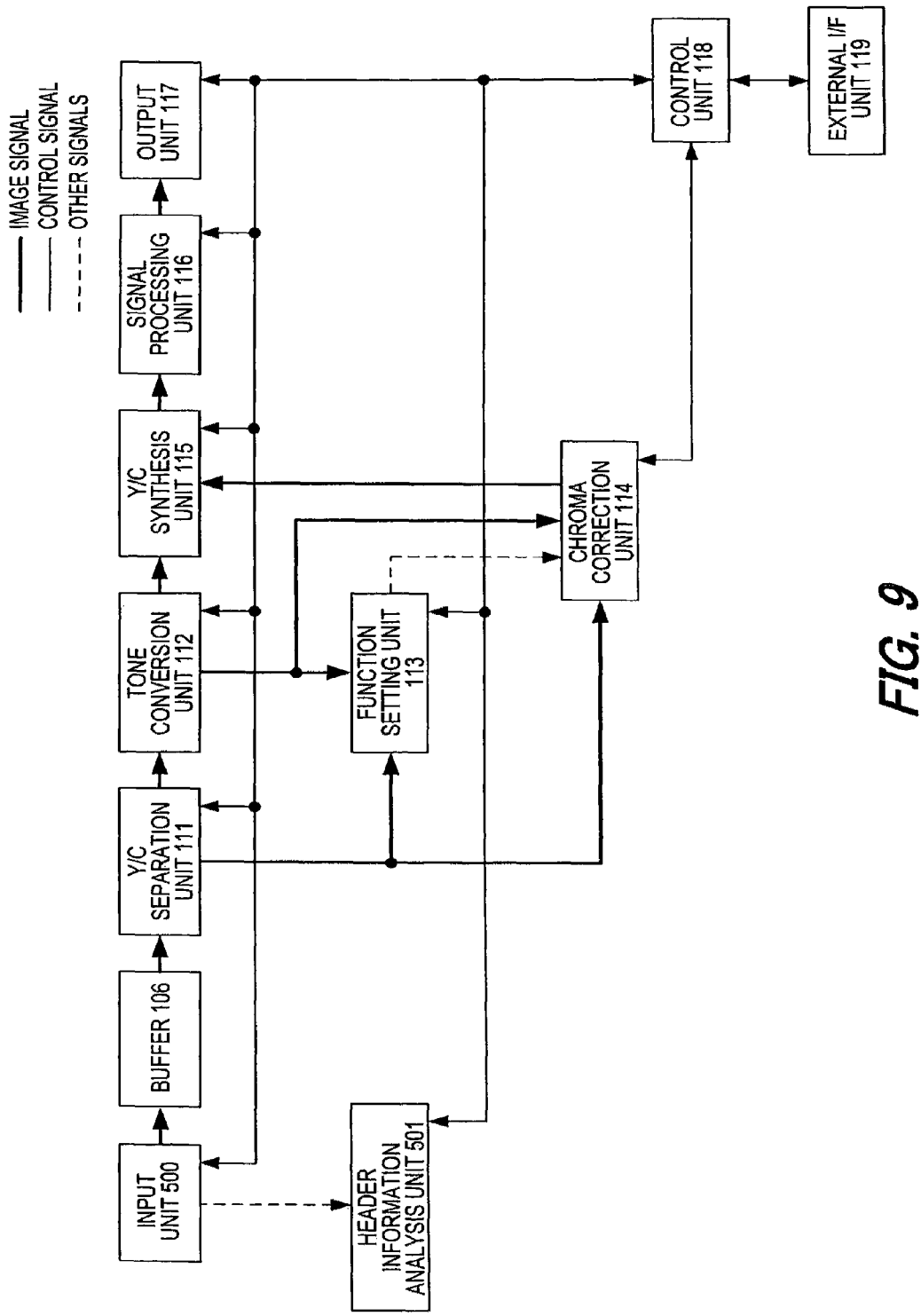
FIG. 9 is a constitutional diagram of a partially modified example of the first embodiment.

For example, a color image signal captured by a separate imaging unit may be recorded on a recording medium such as a memory card in an unprocessed Raw data format, whereupon auxiliary information such as the color filter and exposure information at the time of shooting are recorded in a header and these data are read and processed by the constitution shown in FIG. 9.

FIG. 9 shows an aspect in which the lens system 100, aperture 101, color filter 102, CCD 103, amplifier 104, A/D converter 105, pre-white balance adjustment unit 107, exposure control unit 108, focus control unit 109, and AF motor 110 have been omitted from the constitution shown in FIG. 1, and an input unit 500 and a header information analysis unit 501 have been added. The basic constitution is substantially identical to that of FIG. 1, and identical constitutions have been allocated identical names and numbers.

To describe only the differences, the input unit 500 is connected to the buffer 106 and the header information analysis unit 501. The control unit 118 is connected bilaterally to the input unit 500 and the header information analysis unit 501.

When a playback operation is begun via the external I/F unit 119, which takes the form of a mouse, a keyboard, or the like, the color image signal and header information stored on the recording medium, which takes the form of a memory card or the like, is read from the input unit 500.

The image signal from the input unit 500 is transferred to the buffer 106, while the header information is transferred to the header information analysis unit 501. The header information analysis unit 501 extracts imaging information from the header information, and transfers the extracted imaging information to the control unit 118. Subsequent processing is identical to that shown in FIG. 1.

Furthermore, in the embodiment described above, it is assumed that the processing is performed using hardware, but this invention does not have to be limited to such a constitution. For example, the color image signal from the CCD 103 may be output as unprocessed Raw data, the color filter, information relating to the exposure at the time of shooting, information relating to the functions used during chroma correction processing, and so on may be output from the control unit 118 as the header information, and processing may be performed using separate software.

Figure 10A:
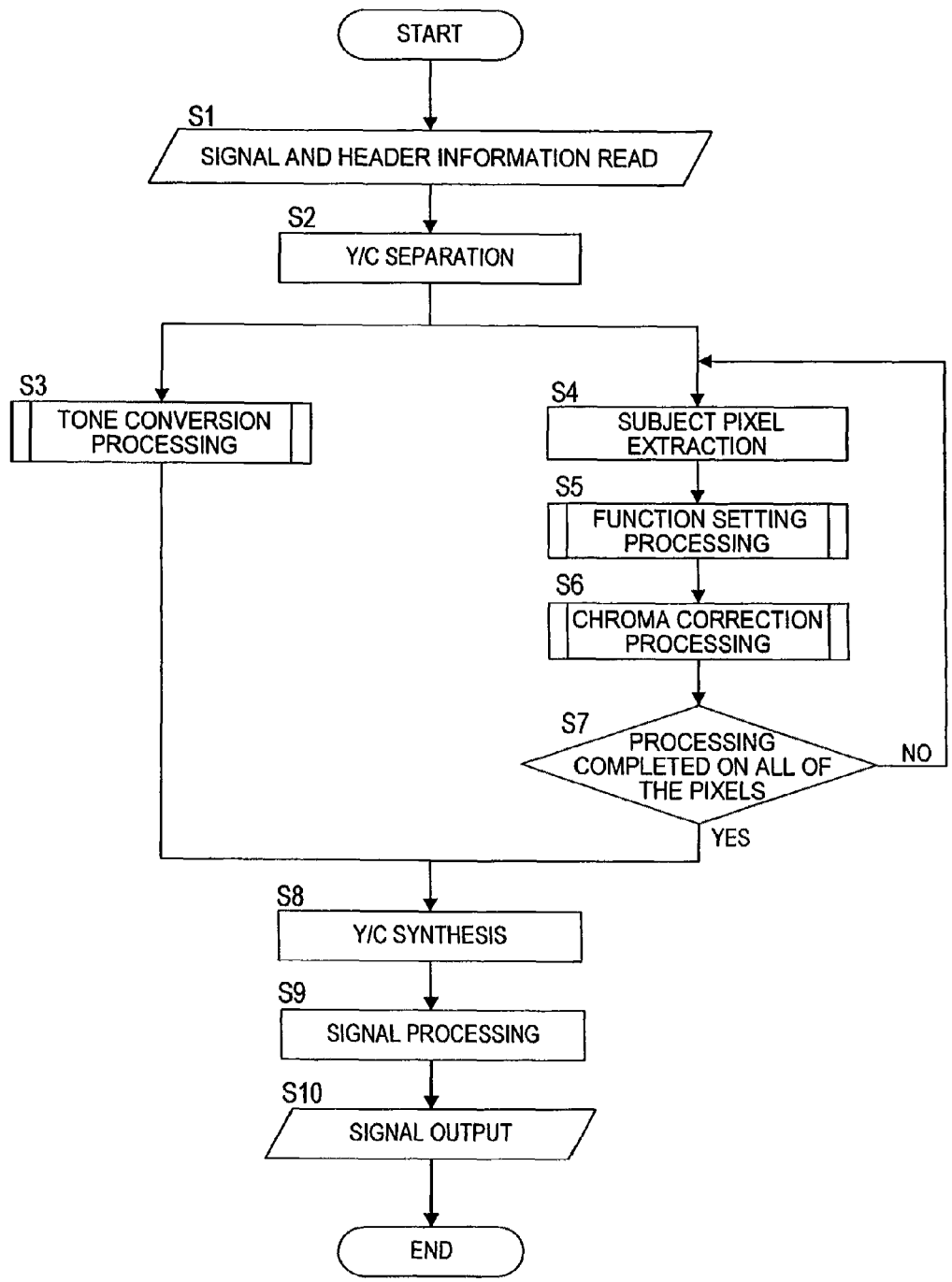
FIG. 10A shows a flow relating to overall processing in a signal processing flow.

FIG. 10A shows a flow of software processing when the processing described above is executed by a computer, and corresponds to the processing from the Y/C separation unit 111 to the output unit 117 in FIG. 1.

To describe the processing of each step, in a step S1, a color image signal and header information such as the color filter and information relating to the exposure at the time of shooting are read.

In a step S2, the luminance signal Y and the color signals Cb, Cr are calculated on the basis of Equation (1).

In a step S3, tone conversion processing is implemented on the luminance signal Y to calculate the tone conversion-processed luminance signal Y'. Tone conversion processing is executed in accordance with a flow shown in FIG. 10B, which will be described later.

In a step S4, subject pixels are extracted sequentially.

In a step S5, the functions to be used during chroma correction processing of the color signals Cb, Cr are set. Function setting processing is executed in accordance with a flow shown in FIG. 10C, which will be described later.

In a step S6, chroma correction processing is implemented on the color signals Cb, Cr to calculate the chroma correction-processed color signals Cb', Cr'. Chroma correction processing is performed such that the ratio of the chroma correction-processed color signals Cb', Cr' to the maximum chroma value of the color space is constant. Chroma correction processing is executed in accordance with a flow shown in FIG. 10D, which will be described later.

In a step S7, a determination is made as to whether or not chroma correction processing has been completed on all of the pixels. If not, the routine bifurcates to the step S4, and if so, the routine bifurcates to a step S8.

In the step S8, a color image signal is calculated by synthesizing the tone conversion-processed luminance signal Y' and the chroma correction-processed color signals Cb', Cr' on the basis of Equation (2).

In a step S9, signal processing such as well-known compression processing is performed.

In a step S10, the processed color image signal is output, whereupon the routine is terminated.

Figure 10B:
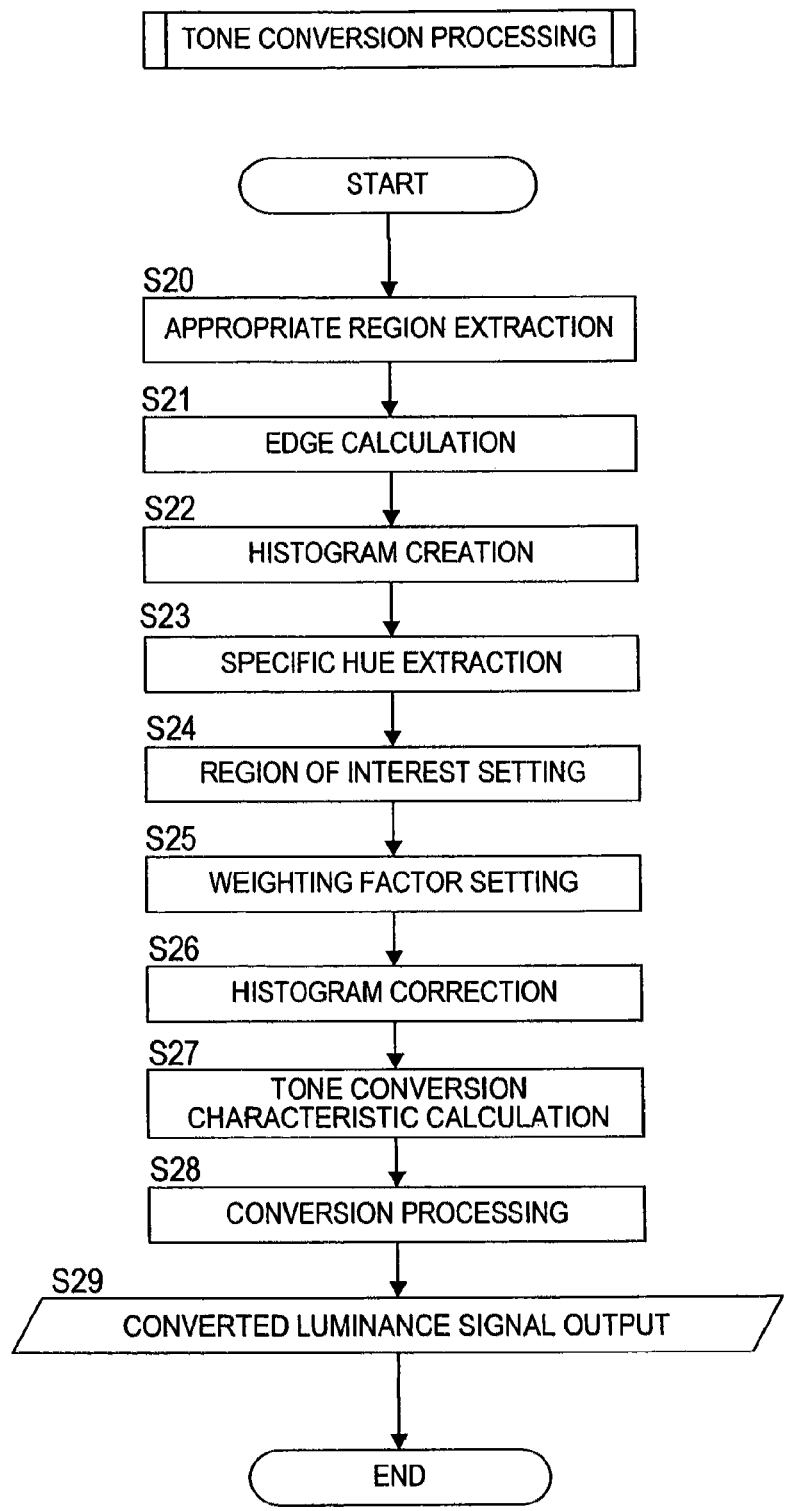
FIG. 10B shows a flow relating to tone conversion processing in the signal processing flow.

FIG. 10B shows the flow of the tone conversion processing of the step S3, and corresponds to the processing of the tone conversion unit 112 shown in FIG. 3.

In a step S20, the luminance signal Y is compared with predetermined thresholds relating to the dark portion and the light portion, and a luminance signal Y which is equal to or greater than the dark portion threshold and equal to or smaller than the light portion threshold is extracted as an appropriate exposure region.

In a step S21, well-known processing is performed to calculate the edge strength of the luminance signal Y in the appropriate exposure region using a Laplacian filter or the like.

In a step S22, pixels having an edge strength that is equal to or greater than a predetermined threshold are selected, and a histogram is created.

In a step S23, the color signals Cb, Cr are compared to a predetermined threshold to extract a skin color region.

In a step S24, a region determined to be the face of a person is extracted as a region of interest on the basis of information pertaining to the skin color region.

In a step S25, the luminance signal Y in the region of interest is determined and multiplied by a predetermined coefficient to calculate a correction weighting factor relating to each luminance level.

In a step S26, correction is performed by adding the weighing coefficient to each luminance level of the histogram.

In a step S27, histograms are accumulated and normalized to calculate the tone conversion characteristic.

In a step S28, tone conversion processing is implemented on the luminance signal Y using the tone conversion characteristic to calculate the tone conversion-processed luminance signal Y'.

In a step S29, the tone conversion-processed luminance signal Y' is output, whereupon the routine is terminated.

Figure 10C:
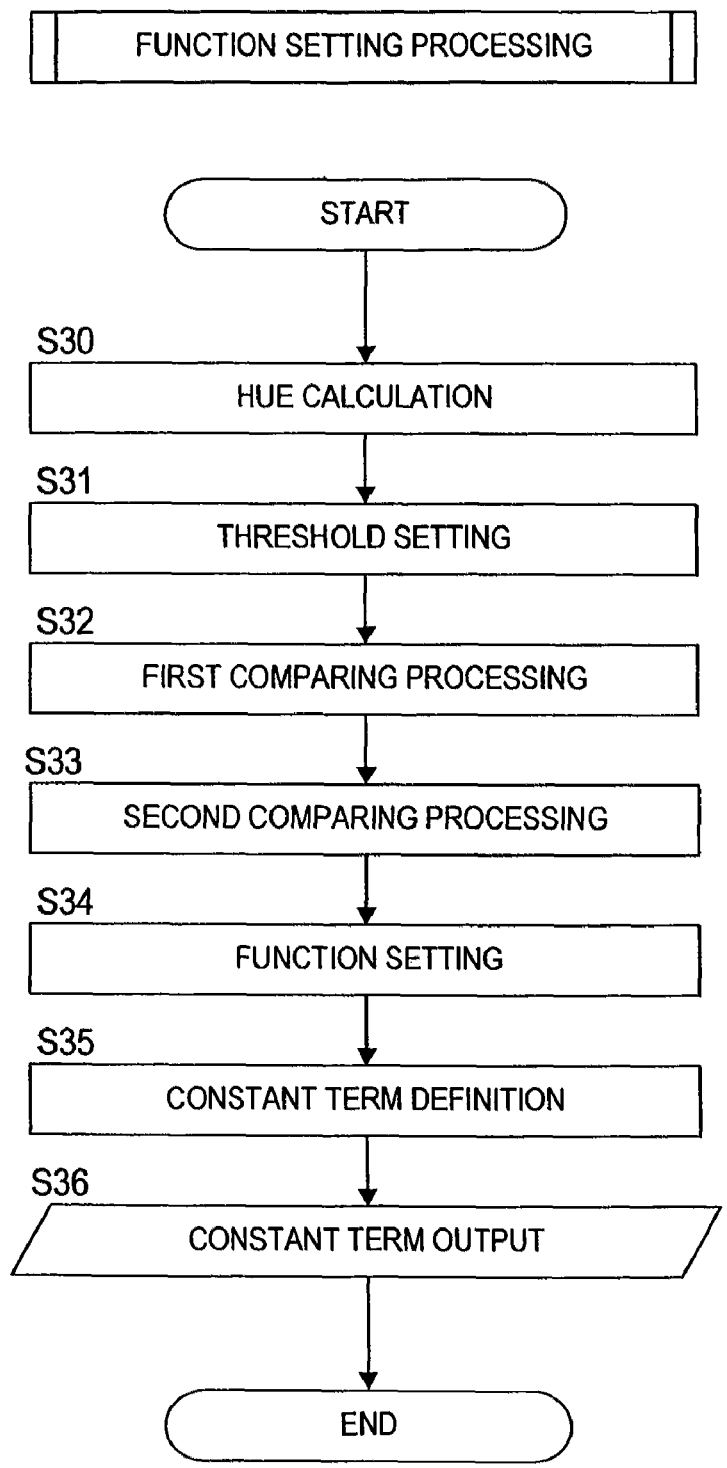
FIG. 10C shows a flow relating to function setting processing in the signal processing flow.

FIG. 10C shows the flow of the function setting processing of the step S5, and corresponds to the processing of the function setting unit 113 shown in FIG. 4.

In a step S30, classification into four hue regions is performed as shown in Table 1, based on the sign of the color signals Cb, Cr relating to the subject pixel.

In a step S31, the threshold $y^\theta_{th}$ corresponding to the four hue regions is set.

In a step S32, the value $y_0$ of the luminance signal relating to the subject pixel is compared with the threshold $y^\theta_{th}$.

In a step S33, the value $y_1$ of the tone conversion-processed luminance signal relating to the subject pixel is compared with the threshold $y^\theta_{th}$.

In a step S34, functions are set on the basis of the results of the comparisons with the threshold $y^\theta_{th}$, as shown in Table 2.

In a step S35, the constant terms a, b, c, d of the corresponding functions are defined, as shown in Table 2.

In a step S36, the constant terms a, b, c, d of the functions are output, whereupon the routine is terminated.

Figure 10D:
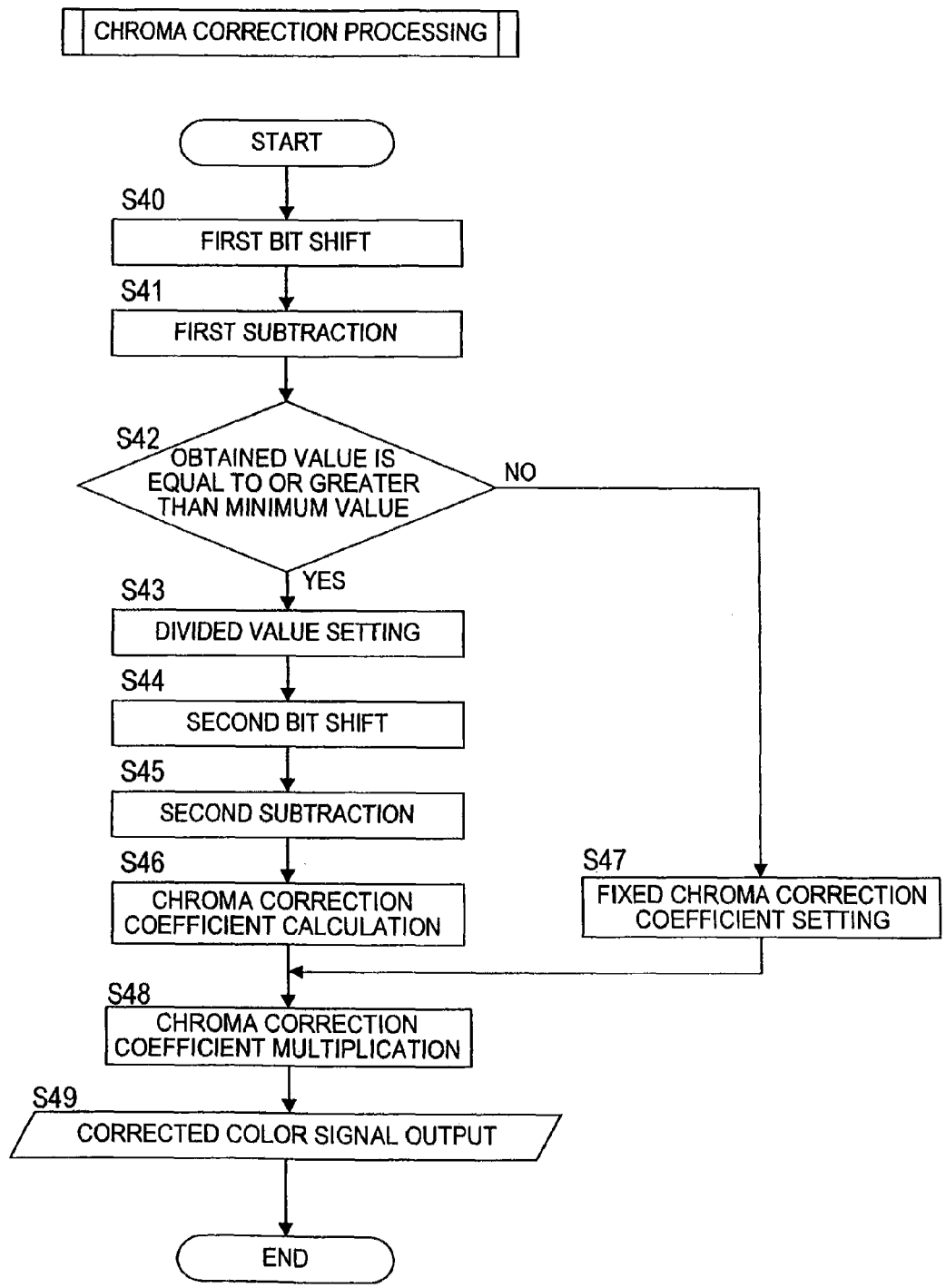
FIG. 10D shows a flow relating to chroma correction processing in the signal processing flow.

FIG. 10D shows a flow relating to the chroma correction processing of the step S6, and corresponds to the processing of the chroma correction unit 114 shown in FIG. 7.

In a step S40, bit shift processing is performed on the value $y_0$ of the luminance signal relating to the subject pixel to extract the higher order bit component.

In a step S41, subtraction processing is performed between the value $y_0$ of the luminance signal and the constant term d.

In a step S42, the value "$y_0-d$" of the subtraction-processed luminance signal is compared with a predetermined threshold. When the value "$y_0-d$" is equal to or greater than the threshold, the routine bifurcates to a step S43, and when the value "$y_0-d$" is less than the threshold, the routine bifurcates to a step S47.

In the step S43, the inverse "$1/(y_0-d)$" of the value "$y_0-d$" of the subtraction-processed luminance signal is determined on the basis of a table.

In a step S44, bit shift processing is performed on the value $y_1$ of the tone-processed luminance signal relating to the subject pixel to extract the higher order bit component.

In a step S45, subtraction processing is performed between the value $y_1$ of the tone-processed luminance signal and the constant term b.

In a step S46, the chroma correction coefficient kc is determined as shown in Equation (3).

In the step S47, when the absolute value of the value "$y_0-d$" of the subtraction-processed luminance signal is less than the threshold, the chroma correction coefficient kc is set at 1.

In a step S48, chroma correction processing is implemented on the color signals Cb, Cr of the subject pixel as shown in Equation (4) to calculate Cb', Cr' following chroma correction processing.

In a step S49, the chroma correction-processed color signals Cb', Cr' are output, whereupon the routine is terminated.

The processing described above may be performed by software, thereby obtaining the same actions and effects as those achieved when the processing is performed by hardware.

Next, a second embodiment of this invention will be described.

Figure 11:
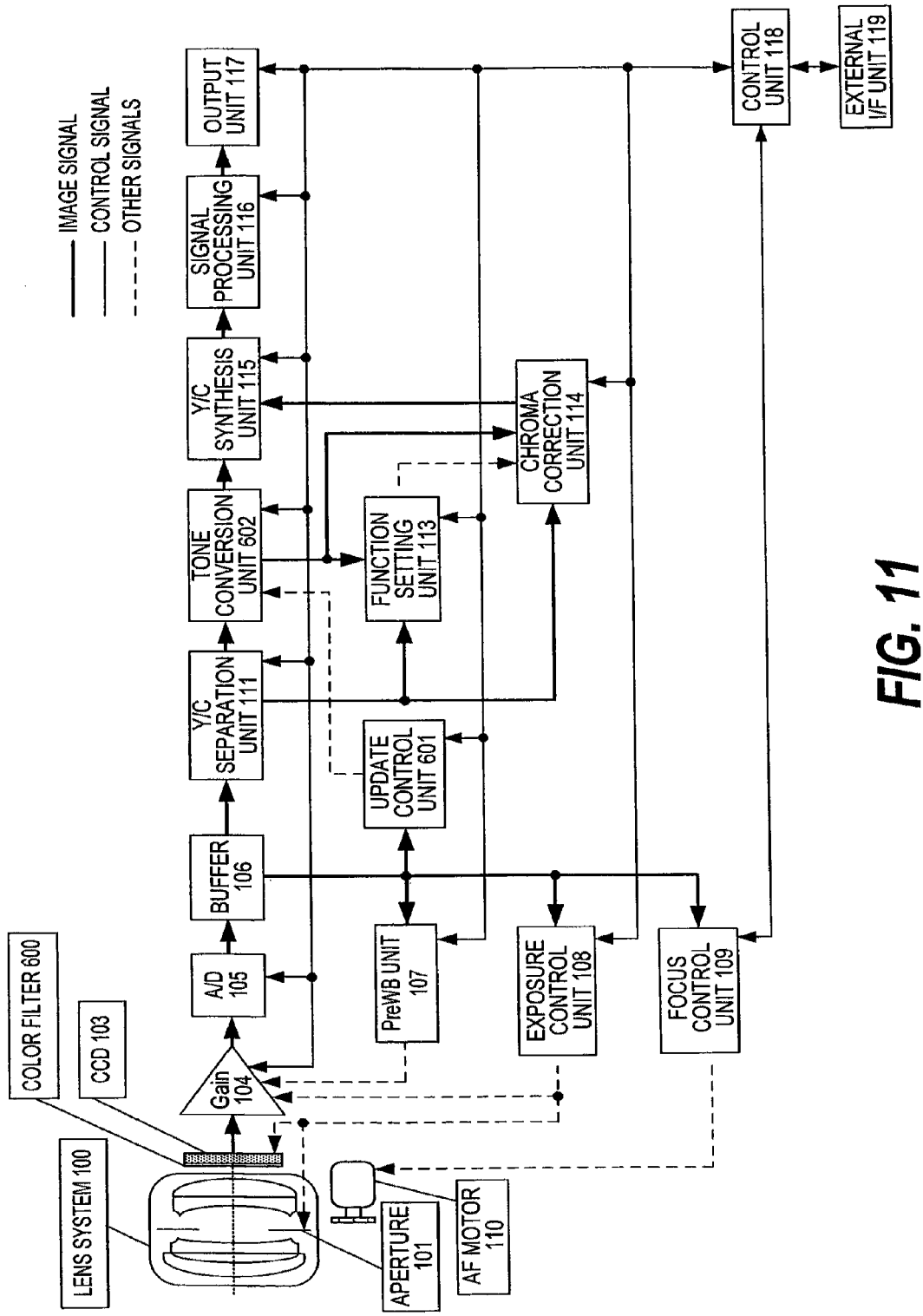
FIG. 11 is a constitutional diagram of a second embodiment of this invention.

First, the constitution thereof will be described. FIG. 11 is a constitutional diagram of the second embodiment. The second embodiment differs from the first embodiment shown in FIG. 1 in that an update control unit 601 is added, the color filter 102 is replaced by a color filter 600, and the tone conversion unit 112 is replaced by a tone conversion unit 602. The basic constitution is substantially identical to that of the first embodiment, and identical constitutions have been allocated identical names and numbers.

Parts that differ from the first embodiment will be focused on in the following description. A color image signal captured via the lens system 100, the aperture 101, the color filter 600, and the CCD 103 is amplified by the amplifier 104, converted into a digital signal by the A/D converter 105, and transferred to the buffer 106.

The buffer 106 is connected to the pre-white balance adjustment unit 107, the exposure control unit 108, the focus control unit 109, the Y/C separation unit 111, and the update control unit 601. The update control unit 601 is connected to the tone conversion unit 602. The Y/C separation unit 111 is connected to the tone conversion unit 602, and the tone conversion unit 602 is connected to the function setting unit 113, the chroma correction unit 114, and the Y/C synthesis unit 115. The control unit 118 is connected bilaterally to the update control unit 601 and the tone conversion unit 602.

Next, the content of signal processing will be described. The basic actions of the second embodiment are substantially identical to those of the first embodiment. The following description focuses on the differences.

The flow of the color image signal will be described with reference to FIG. 11. The pre-shooting mode is entered by half-pressing the shutter button via the external I/F unit 119. A plurality of color image signals captured chronologically via the lens system 100, aperture 101, color filter 600, and CCD 103 are transferred in sequence to the buffer 106 via the amplifier 104 and the A/D converter 105. The buffer 106 has sufficient capacity for recording a plurality of color image signals, and when it becomes full, the color image signals are overwritten in chronological order from the oldest color image signal.

Figure 12:
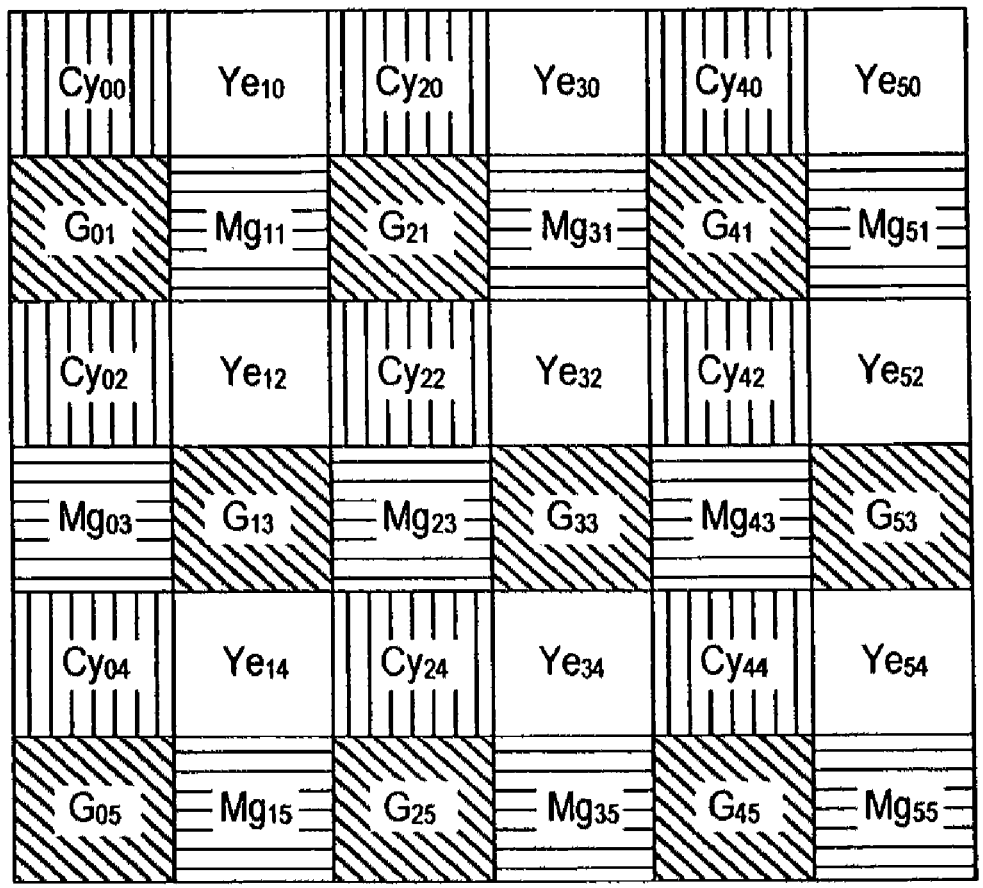
FIG. 12 is an illustrative view relating to a color difference line sequential-type complementary color filter.

Further, in this embodiment, the CCD 103 is a single CCD in which a color difference line sequential-type complementary color filter is disposed on a front surface as the color filter 600. FIG. 12 shows the constitution of a color difference line sequential-type complementary color filter. As shown in FIG. 12, in a color difference line sequential system, a basic unit is constituted by 2×2 pixels, one cyan (Cy) pixel, one magenta (Mg) pixel, one yellow (Ye) pixel, and one green (G) pixel being disposed in each basic unit. It should be noted, however, that the positions of Mg and G are reversed on each line. The color image signals in the buffer 106 are transferred to the update control unit 601.

On the basis of the control performed by the control unit 118, the update control unit 601 detects whether or not scene variation occurs among the plurality of chronologically captured color image signals. When scene variation occurs, the update control unit 601 transmits a control signal to the tone conversion unit 602 to update the tone conversion characteristic used in tone conversion processing of the luminance signal.

On the basis of the control performed by the control unit 118, the Y/C separation unit 111 calculates the luminance signal Y and the color signals Cb, Cr in 2×2 pixel units from the Cy, Mg, Ye, G color image signals in the buffer 106, based on Equation (7).

$$Y = G + Mg + Ye + Cy$$

$$Cb = (Mg+Cy) - (G+Ye)$$

$$Cr = (Mg+Ye) - (G+Cy) \qquad (7)$$

The color signals Cb, Cr are obtained alternately in one-line intervals, and these intervals are filled by applying a well-known interpolation method. The luminance signal Y and color signals Cb, Cr are transferred to the tone conversion unit 602, the function setting unit 113, and the chroma correction unit 114.

On the basis of the control performed by the control unit 118, the tone conversion unit 602 performs tone conversion processing on the luminance signal Y. It should be noted that when an update control signal has been transmitted by the update control unit 601, the tone conversion characteristic to be used in the tone conversion processing is calculated in predetermined region units. The tone conversion-processed luminance signal Y' is transferred to the function setting unit 113, the chroma correction unit 114, and the Y/C synthesis unit 115.

In the chroma correction unit 114, similarly to the first embodiment, chroma correction processing is performed on the basis of the luminance signal Y and the tone conversion-processed luminance signal Y' such that the ratio thereof to the maximum chroma value of the color space is constant.

Figure 13:
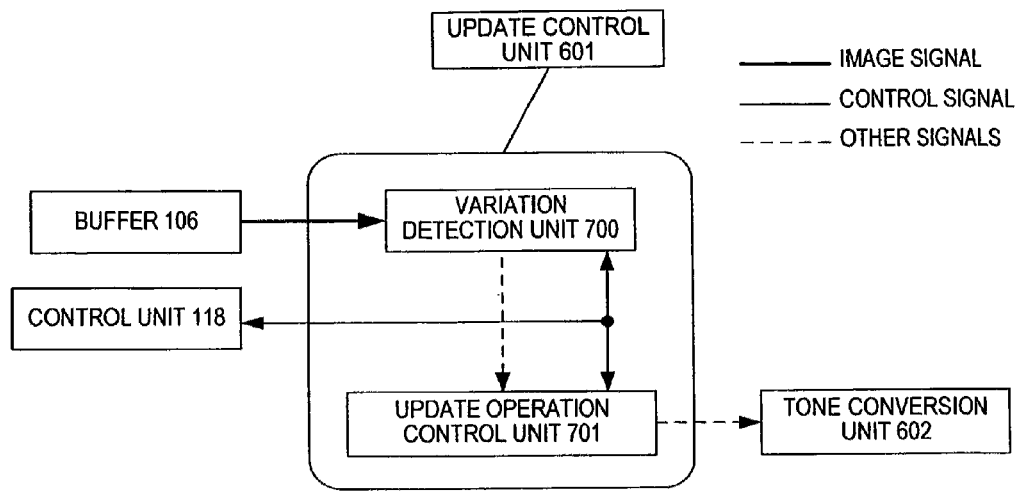
FIG. 13 is a constitutional diagram of an update control unit.

FIG. 13 shows an example of the constitution of the update control unit 601. The update control unit 601 is constituted by a variation detection unit 700 and an update operation control unit 701. The buffer 106 is connected to the variation detection unit 700. The variation detection unit 700 is connected to the update operation control unit 701. The update operation control unit 701 is connected to the tone conversion unit 602. The control unit 118 is connected bilaterally to the variation detection unit 700 and the update operation control unit 701.

On the basis of the control performed by the control unit 118, the variation detection unit 700 reads a currently captured color image signal and the immediately preceding color image signal from the buffer 106, and performs well-known processing to detect scene variation or other differences between the two color image signals. The result of the scene variation detection processing is transferred to the update operation control unit 701.

On the basis of the control performed by the control unit 118, when scene variation is detected, the update operation control unit 701 transmits a control signal to the tone conversion unit 602 to update the tone conversion characteristic used in tone conversion processing. It should be noted that in relation to the first color image signal at the start of shooting, the control unit 118 performs control to halt the processing of the variation detection unit 700 such that the update control signal is transmitted to the update operation control unit 701.

In this embodiment, tone conversion characteristic update control is performed by detecting scene variation, but this invention does not have to be limited to this constitution, and update control may be performed at fixed time intervals, for example.

Figure 14:
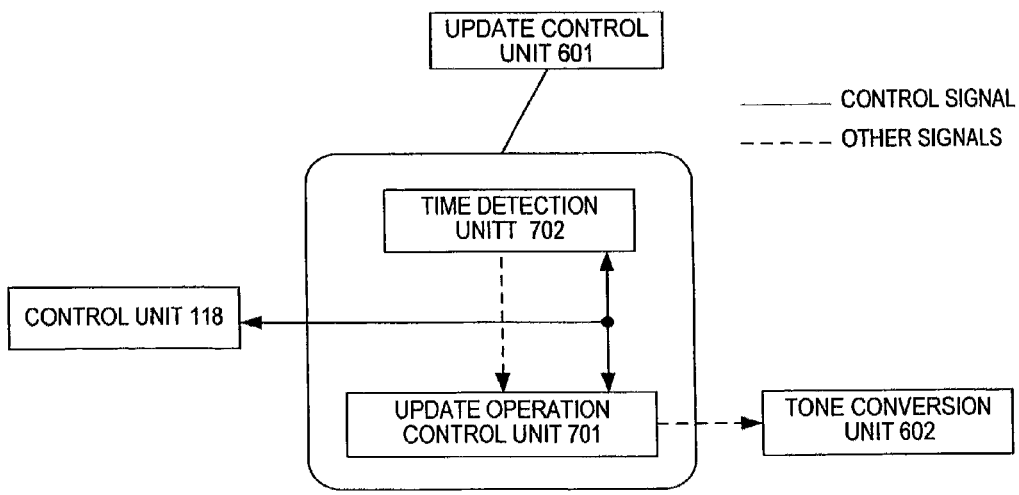
FIG. 14 is a constitutional diagram of an update control unit according to another aspect.

FIG. 14 shows an example of a constitution in which the update control unit 601 performs update control at fixed time intervals, as described above.

The update control unit 601 is constituted by a time detection unit 702 and the update operation control unit 701. The time detection unit 702 is connected to the update operation control unit 701. The update operation control unit 701 is connected to the tone conversion unit 602. The control unit 118 is connected bilaterally to the time detection unit 702 and the update operation control unit 701.

On the basis of the control performed by the control unit 118, the time detection unit 702 detects whether or not a predetermined time period, for example one second, has elapsed following the start of shooting. The result of the time detection processing is transferred to the update operation control unit 701.

On the basis of the control performed by the control unit 118, when the predetermined time period has been detected, the update operation control unit 701 transmits a control signal to the tone conversion unit 602 to update the tone conversion characteristic used in tone conversion processing. It should be noted that in relation to the first color image signal at the start of shooting, the control unit 118 performs control to transmit the update control signal to the update operation control unit 701.

Figure 15:
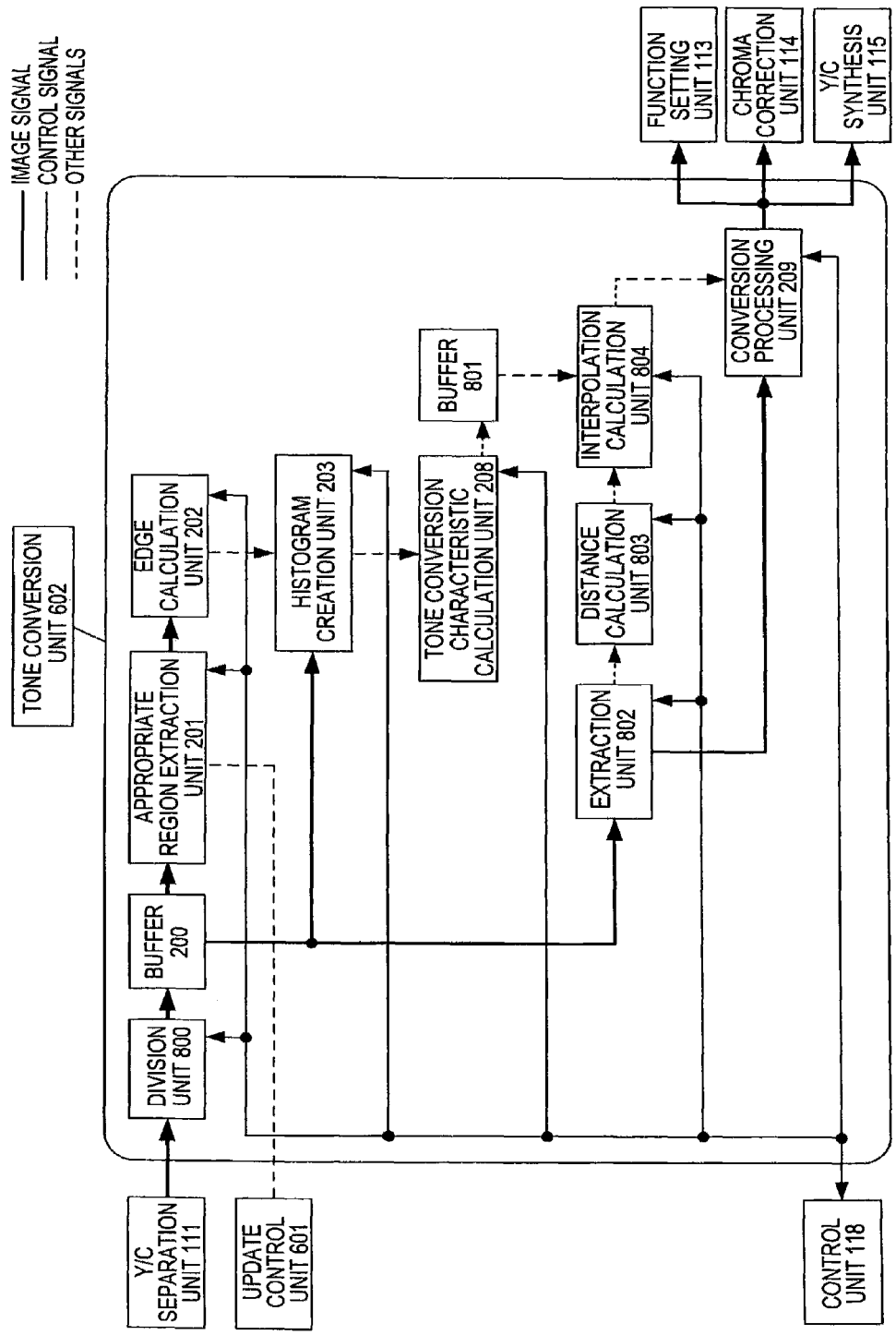
FIG. 15 is a constitutional diagram of a tone conversion unit.

FIG. 15 shows an example of the constitution of the tone conversion unit 602. In this constitution, a division unit 800, a buffer 801, an extraction unit 802, a distance calculation unit 803, and an interpolation calculation unit 804 have been added to the tone conversion unit 112 of the first embodiment, shown in FIG. 3, and the histogram correction unit 204, hue calculation unit 205, person determination unit 206, and weighting factor setting unit 207 have been omitted therefrom. The basic constitution of the tone conversion unit 602 is substantially identical to that of the tone conversion unit 112 shown in FIG. 3, and identical constitutions have been allocated identical names and numbers.

The following description will focus on the differences. The Y/C separation unit 111 is connected to the division unit 800, and the division unit 800 is connected to the appropriate region extraction unit 201, histogram creation unit 203, and extraction unit 802 via the buffer 200. The histogram creation unit 203 is connected to the interpolation calculation unit 804 via the tone conversion characteristic calculation unit 208 and the buffer 801. The extraction unit 802 is connected to the distance calculation unit 803 and the conversion processing unit 209. The distance calculation unit 803 is connected to the interpolation calculation unit 804, and the interpolation calculation unit 804 is connected to the conversion processing unit 209. The update control unit 601 is connected to the appropriate region extraction unit 201. The control unit 118 is connected bilaterally to the division unit 800, extraction unit 802, distance calculation unit 803, and interpolation calculation unit 804.

On the basis of the control performed by the control unit 118, the division unit 800 reads the luminance signal Y of the currently captured color image signal from the Y/C separation unit 111, divides the luminance signal Y into regions of a predetermined size, for example regions of 64×64 pixel size, and transfers the results in sequence to the buffer 200.

Figure 16A:
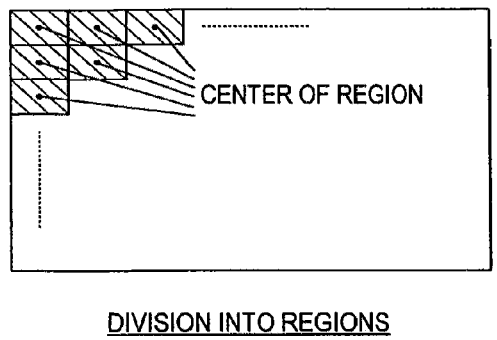
FIGS. 16A and 16B are illustrative diagrams relating to interpolation calculation of a tone conversion characteristic.

FIG. 16A shows division of the luminance signal Y into regions. Each region is disposed without overlap. The appropriate region extraction unit 201 reads the luminance signal Y from the buffer 200 in region units only when an update control signal has been received from the update control unit 601, and compares the luminance signal Y with predetermined thresholds relating to a dark portion and a light portion (with a 12 bit tone, the dark portion is 128 and the light portion is 3968, for example). The appropriate region extraction unit 201 then transfers a luminance signal Y which is equal to or higher than the dark portion threshold and equal to or lower than the light portion threshold to the edge calculation unit 202 as an appropriate exposure region.

On the basis of the control performed by the control unit 118, the edge calculation unit 202 reads the appropriate exposure region luminance signal Y from the appropriate region extraction unit 201, and performs well-known edge strength calculation processing using a Laplacian filter or the like. The calculated edge strength is transferred to the histogram creation unit 203.

On the basis of the control performed by the control unit 118, the histogram creation unit 203 selects a pixel having an edge strength that is equal to or higher than a predetermined threshold (64 in the case of a 12 bit tone, for example) in relation to the edge strength from the edge calculation unit 202, and reads the luminance signal Y in a corresponding pixel position from the buffer 200. The histogram creation unit 203 then creates a histogram in relation to the read luminance signal, and transfers the created histogram to the tone conversion characteristic calculation unit 208.

On the basis of the control performed by the control unit 118, the tone conversion characteristic calculation unit 208 accumulates histograms from the histogram creation unit 203, and normalizes the histograms to calculate the tone conversion characteristic. Normalization is performed in accordance with the tones of the image signal such that with 12 bits, normalization is performed within a range of 0 to 4095, for example. The tone conversion characteristic is then transferred to the buffer 801. The processing of the appropriate region extraction unit 201, edge calculation unit 202, histogram creation unit 203, and tone conversion characteristic calculation unit 208 described above is performed synchronously in region units on the basis of the control performed by the control unit 118.

The buffer 801 stores tone conversion characteristics corresponding to all of the regions. When calculation of the tone conversion characteristic is complete, the control unit 118 controls the extraction unit 802 to extract subject pixels from the buffer 200 in sequence. The value $y_0$ of the luminance signal of the extracted subject pixel is transferred to the distance calculation unit 803 and the conversion processing unit 209. The distance calculation unit 803 calculates distances $d_m$ (m=1 to 4) between the subject pixel extracted by the extraction unit 802 and four regions positioned in the vicinity thereof.

Figure 16B:
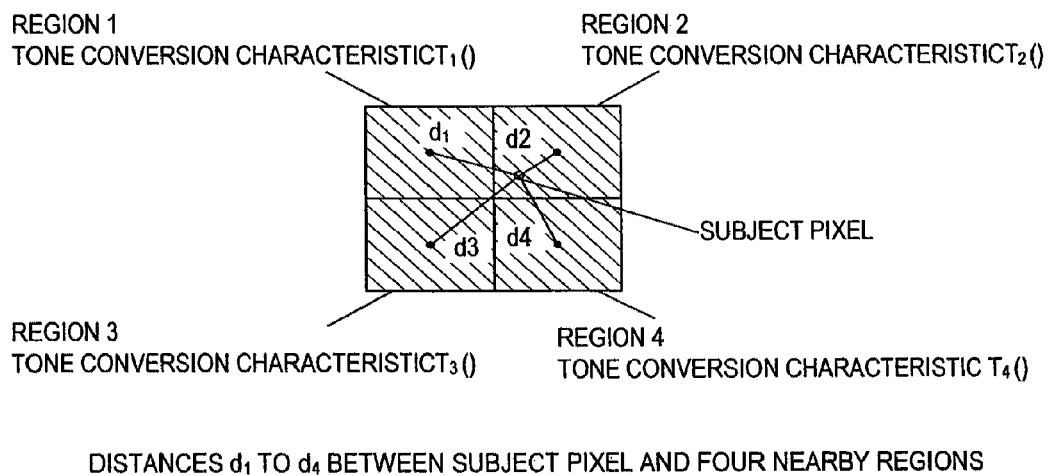

FIG. 16B shows the disposition of the subject pixel and the four nearby regions. The distances are calculated from the subject pixel to the center of the region. Hereafter, the calculated distances to the four nearby regions will be expressed as $d_m$ (m=1 to 4), and the tone conversion characteristics of the four nearby regions will be expressed as $T_m()$. The calculated distances $d_m$ are transferred to the interpolation calculation unit 804.

On the basis of the control performed by the control unit 118, the interpolation calculation unit 804 reads the distances $d_m$ from the distance calculation unit 803 and the tone conversion characteristics $T_m()$ of the corresponding four nearby regions from the buffer 801, and sets a conversion equation for use in an interpolation calculation, as shown on the right side of Equation (8).

$$y_1 = \frac{1}{D}\left(\frac{T_1(y_0)}{d_1} + \frac{T_2(y_0)}{d_2} + \frac{T_3(y_0)}{d_3} + \frac{T_4(y_0)}{d_4}\right) \quad (8)$$

$$\text{where } D = \frac{1}{d_1} + \frac{1}{d_2} + \frac{1}{d_3} + \frac{1}{d_4}$$

In Equation (8), $y_0$ is the value of the luminance signal relating to the subject pixel prior to tone conversion processing, and $y_1$ is the value of the luminance signal relating to the subject pixel following tone conversion processing. The conversion equation shown on the right side of Equation (8) is transferred to the conversion processing unit 209.

On the basis of the control performed by the control unit 118, the conversion processing unit 209 applies the conversion equation from the interpolation calculation unit 804 to the subject pixel extracted by the extraction unit 802, and by performing this operation on all of the pixels, the tone conversion-processed luminance signal Y' is obtained. The tone conversion-processed luminance signal Y' is transferred to the function setting unit 113, the chroma correction unit 114, and the Y/C synthesis unit 115.

Next, the effects of the above constitutions and processing will be described.

According to the constitution described above, similarly to the first embodiment, the chroma of a color signal can be corrected appropriately in accordance with modification of the luminance signal accompanying tone conversion processing, and therefore a natural, high-quality color image signal with little visual unpleasantness is obtained. Further, chroma correction processing of the color signal is performed on the basis of functions, and therefore the chroma correction processing is simplified, enabling an increase in the speed and a reduction in the cost of the image processing apparatus.

Furthermore, in the tone conversion processing, the tone conversion characteristic is determined adaptively from an edge histogram of the luminance signal, and therefore highly precise, appropriate tone conversion processing can be performed on various types of color image signals.

Furthermore, the tone conversion characteristic is determined independently in each region, and therefore an improvement in freedom is achieved and high-quality color image signals are obtained even in scenes having a large light-dark ratio. The tone conversion characteristics that are determined independently in each region are synthesized through an interpolation calculation, and therefore discontinuity between regions does not occur, and high-quality color image signals are obtained.

Further, similarly to the first embodiment, in chroma correction processing an optimal function is selected on the basis of the original luminance signal, the tone conversion-processed luminance signal, and hue information. The four functions are simple, enabling a reduction in the amount of memory required to record them and a corresponding reduction in the cost of the image processing apparatus.

Moreover, the latter stage calculation processing is performed after defining the constant terms of the functions, and therefore the speed of the calculations performed during chroma correction processing can be increased, enabling a reduction in the processing time.

Furthermore, the chroma correction coefficient is calculated on the basis of subtraction processing and multiplication processing after extracting a predetermined higher order bit component from the luminance signal and the tone conversion-processed luminance signal, enabling reductions in the processing time and the scale of the hardware.

Further, when the magnitude of a denominator term of the function is smaller than a predetermined threshold, the chroma correction coefficient is set at 1, and therefore the stability of the calculation processing improves, and a high-quality color image signal is obtained.

Further, control is performed to update the tone conversion characteristic by detecting scene variation during shooting and the shooting time, and therefore unnecessary calculation processing in the image processing apparatus can be avoided, enabling reductions in processing time and power consumption.

Further, the YCbCr color space is easy to convert, and therefore the image processing apparatus can be increased in speed and reduced in cost. The processed luminance signal and color signals are converted into the intended color image signal, and therefore compatibility with the subsequent processing systems is maintained, enabling combination with a wide variety of systems. Moreover, a color difference line sequential-type complementary color filter is highly compatible with current imaging systems, and can therefore be combined with a wide variety of systems.

In the embodiment described above, a color difference line sequential-type complementary color filter is used, but this invention does not have to be limited to this constitution. For example, a Bayer-type primary color filter may be used, as in the first embodiment, and in relation to the imaging device, a two CCD or three CCD imaging device may be used instead of a single CCD imaging device.

Further, control to update the tone conversion characteristic is performed by the update control unit 601, but this invention does not have to be limited to this constitution. For example, the tone conversion characteristic may be updated for each color image signal, similarly to the first embodiment. In this case, the update control unit 601 may be omitted. Further, the update control unit 601 may be added to the first embodiment.

Furthermore, in the embodiment described above, space variant tone conversion processing is performed by the tone conversion unit 602 to determine the tone conversion characteristic in region units, but this invention does not have to be limited to this constitution. For example, space invariant tone conversion processing using a single tone conversion characteristic may be performed, similarly to the first embodiment. On the other hand, the tone conversion unit 112 of the first embodiment may be replaced by the tone conversion unit 602.

Furthermore, in the embodiment described above, it is assumed that the processing is performed using hardware, but this invention does not have to be limited to such a constitution. For example, the plurality of color image signals from the CCD 103 may be output as unprocessed Raw data, the color filter, information relating to the exposure at the time of shooting, information relating to the functions used during chroma correction processing, and so on may be output from the control unit 118 as header information, and processing may be performed using separate software.

Figure 17A:
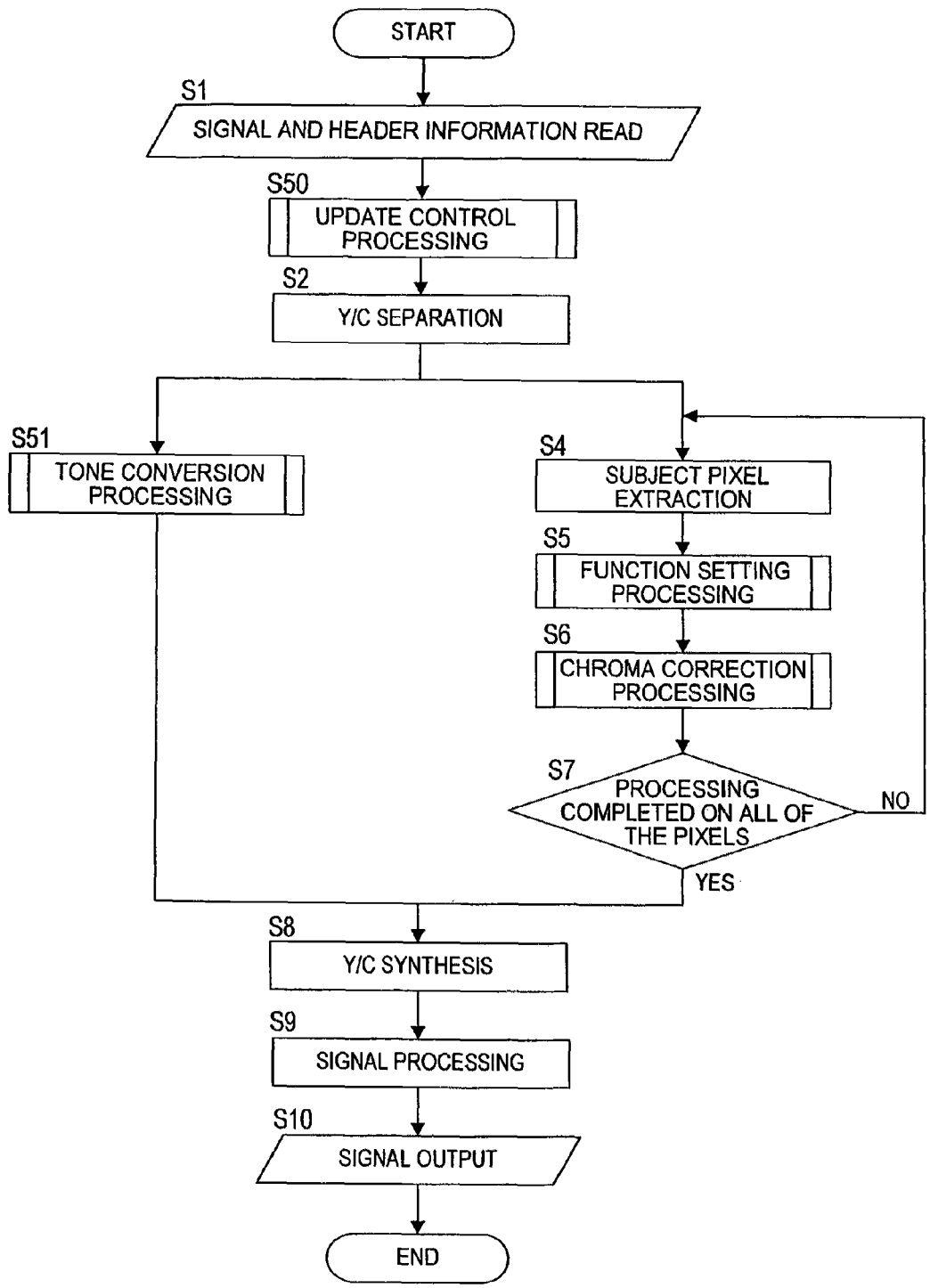
FIG. 17A shows a flow relating to overall processing in a signal processing flow.

FIG. 17A shows a flow of software processing when the processing described above is executed by a computer. Identical processing steps to those of the flow of the first embodiment shown in FIG. 10A have been allocated identical step numbers.

To describe the content of each step, in the step S1, the plurality of color image signals and header information such as the color filter and information relating to the exposure at the time of shooting are read.

In a step S50, control information for determining whether or not to update the tone conversion characteristics used during tone conversion processing is determined. Update processing control is executed in accordance with a flow shown in FIG. 17B, which will be described later.

In the step S2, the luminance signal Y and the color signals Cb, Cr are calculated on the basis of Equation (1).

In a step S51, tone conversion processing is implemented on the luminance signal Y to calculate the tone conversion-processed luminance signal Y'. Tone conversion processing is executed in accordance with a flow shown in FIG. 17C, which will be described later.

In the step S4, subject pixels are extracted sequentially.

In the step S5, the functions to be used during chroma correction processing of the color signals Cb, Cr are set in a similar manner to the flow shown in FIG. 10C.

In the step S6, chroma correction processing is implemented on the color signals Cb, Cr in a similar manner to the flow shown in FIG. 10D to calculate the chroma correction-processed color signals Cb', Cr'. Chroma correction processing is performed such that the ratio of the chroma correction-processed color signals Cb', Cr' to the maximum chroma value of the color space is constant.

In the step S7, a determination is made as to whether or not chroma correction processing has been completed on all of the pixels. If not, the routine bifurcates to the step S4, and if so, the routine bifurcates to the step S8.

In the step S8, a color image signal is calculated by synthesizing the tone conversion-processed luminance signal Y' and the chroma correction-processed color signals Cb', Cr' on the basis of Equation (2).

In the step S9, signal processing such as well-known compression processing is performed.

In the step S10, the processed color image signal is output, whereupon the routine is terminated.

Figure 17B:
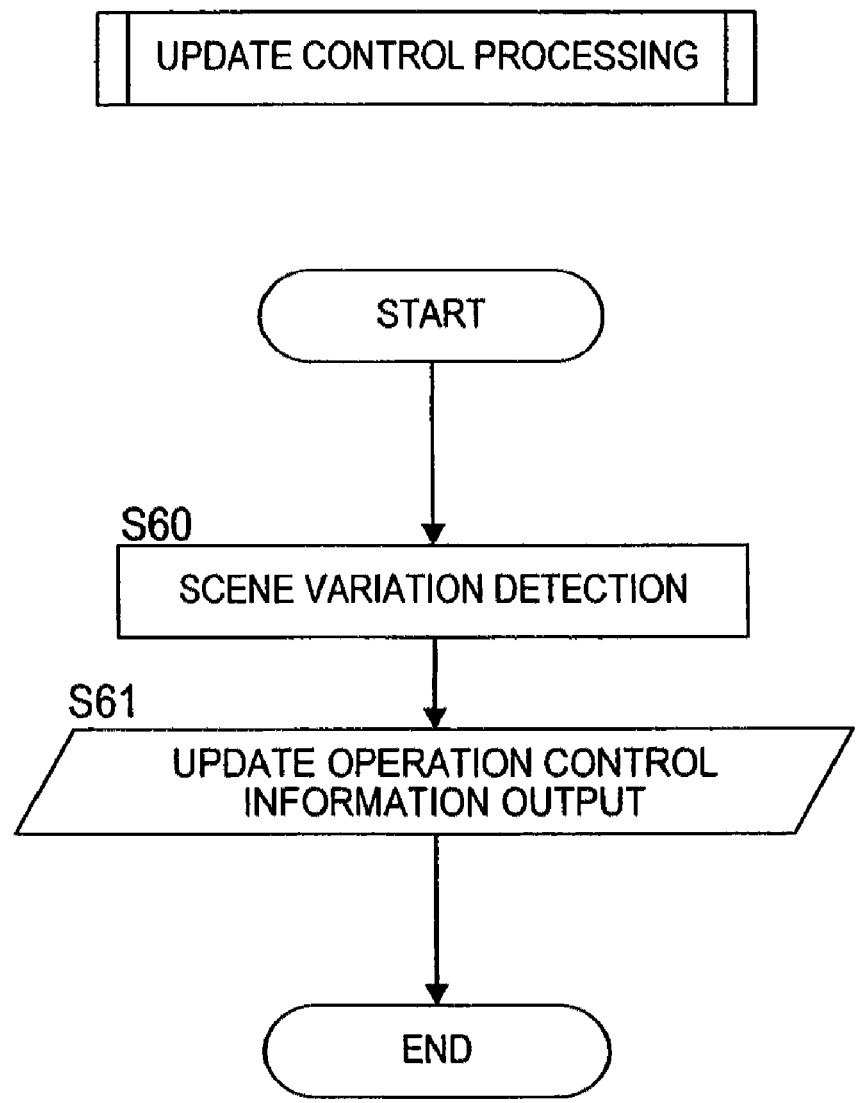
FIG. 17B shows a flow relating to update control processing in the signal processing flow.

FIG. 17B shows a flow relating to the update control processing of the step S50, and corresponds to the processing of the update control unit 601 shown in FIG. 13.

In a step S60, scene variation is detected using a well-known method such as detecting differences among the color image signals.

In a step S61, when scene variation is detected and in the case of the first color image signal, control information is output to update the tone conversion characteristic, whereupon the routine is terminated.

It should be noted that in this example, control is performed to update the tone conversion characteristic by detecting scene variation, but this invention does not have to be limited to such a constitution. For example, update control may be performed at fixed time intervals. In this case, update control corresponds to the processing of the update control unit 601 shown in FIG. 14.

Figure 17C:
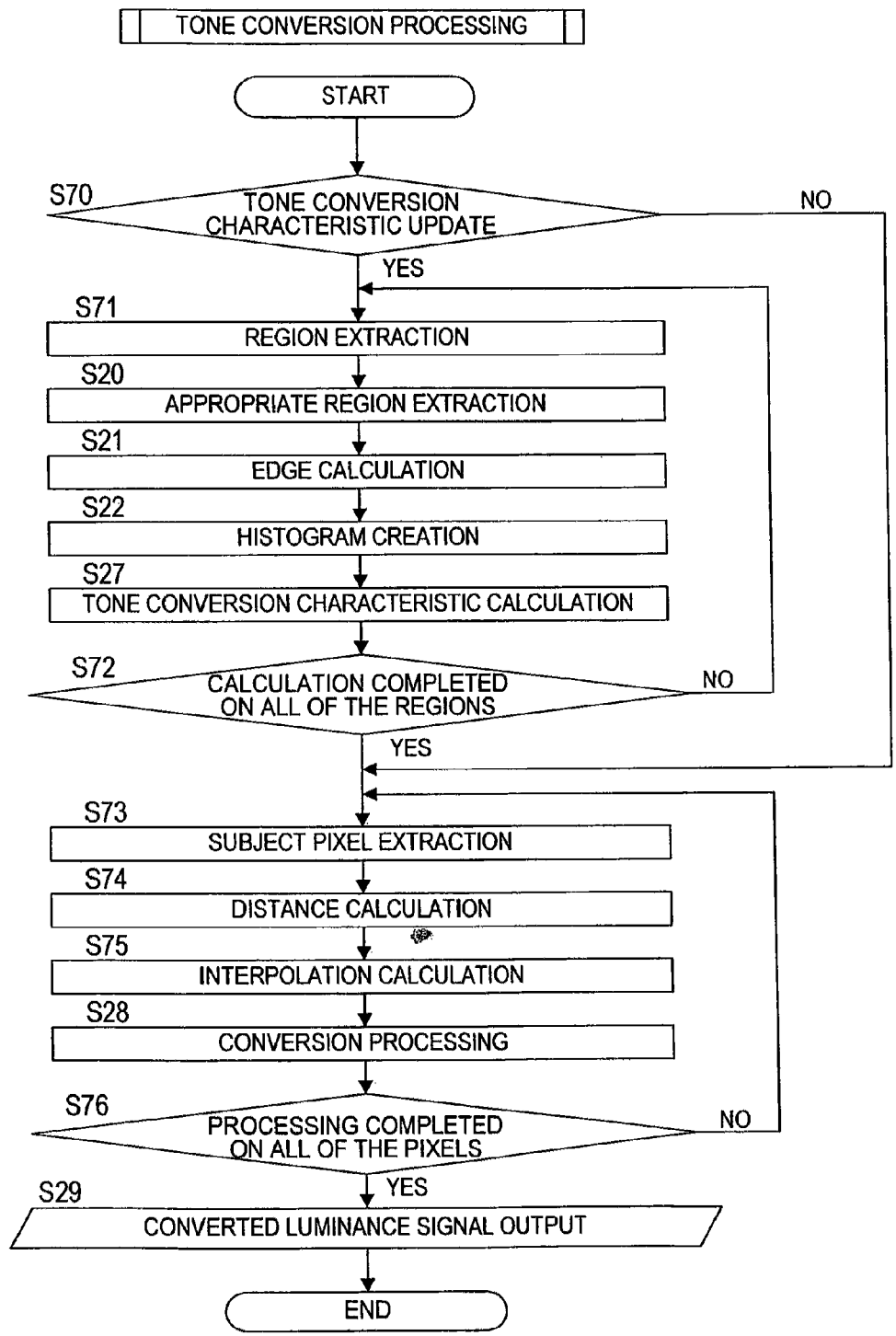
FIG. 17C shows a flow relating to tone conversion processing in the signal processing flow.

FIG. 17C shows a flow relating to the tone conversion processing of the step S51, and corresponds to the processing of the tone conversion unit 602 shown in FIG. 15. Identical processing steps to those of the flow of tone conversion processing according to the first embodiment shown in FIG. 10B have been allocated identical step numbers.

In a step S70, a determination as to whether or not to update the tone conversion characteristic is made on the basis of the control information for updating the tone conversion characteristic, determined in the step S50. If an update is to be performed, the routine bifurcates to a step S71, and if not, the routine bifurcates to a step S73.

In the step S71, the luminance signal Y is divided into regions of a predetermined size, as shown in FIG. 16A, whereupon the regions are extracted sequentially.

In the step S20, the luminance signal Y in the region is compared with predetermined thresholds relating to the dark portion and the light portion, and a luminance signal Y that is equal to or greater than the dark portion threshold and equal to or smaller than the light portion threshold is extracted as an appropriate exposure region.

In the step S21, well-known processing is performed to calculate the edge strength of the luminance signal Y in the appropriate exposure region using a Laplacian filter or the like.

In the step S22, pixels having an edge strength that is equal to or greater than a predetermined threshold are selected, and a histogram is created.

In the step S27, histograms are accumulated and normalized to calculate the tone conversion characteristic.

In a step S72, a determination is made as to whether or not the tone conversion characteristics in all of the regions have been calculated. If not, the routine bifurcates to the step S71, and if so, the routine bifurcates to a step S73.

In the step S73, subject pixels are extracted sequentially from the luminance signal Y.

In a step S74, the distances $d_m$ (m=1 to 4) between the subject pixel and the respective centers of the four nearby regions are calculated, as shown in FIG. 16B.

In a step S75, a conversion equation for use in the interpolation calculation shown on the right side of Equation (8) is set.

In the step S28, tone conversion processing is performed on the subject pixel using the conversion equation.

In a step S76, a determination is made as to whether or not tone conversion processing has been completed on all of the pixels. If not, the routine bifurcates to the step S73, and if so, the routine bifurcates to the step S29.

In the step S29, the tone conversion-processed luminance signal Y' is output, whereupon the routine is terminated.

The processing described above may be performed by software, thereby obtaining the same actions and effects as those achieved when the processing is performed by hardware.

Embodiments of this invention were described above, but the above embodiments are merely examples of application of the invention, and the technical scope of this invention is not limited to the specific constitutions of the above embodiments.

Further, this application claims priority on the basis of Pub 2007-50726, which was filed with the Japan Patent Office on Feb. 28, 2007, the entire content of JP2007-50726 being incorporated into this specification by reference.

the invention claimed is:

1. An image processing apparatus that performs tone conversion processing on a color image signal taken in from an imaging system, comprising:
   a color space conversion unit that converts the color image signal into a luminance signal and a color signal in a predetermined color space;
   a tone conversion unit that performs tone conversion processing on the luminance signal on the basis of a predetermined tone conversion characteristic;
   a function setting unit that sets a function for chroma correction processing using the luminance signal, the tone conversion-processed luminance signal, a maximum value of the luminance signal in the color space, and a luminance value when a maximum chroma is indicated in a hue region to which the color image signal belongs, as parameters; and
   a chroma correction unit that performs chroma correction processing on the color signal using the luminance signal, the tone conversion-processed luminance signal, and the function, and
   wherein the function setting unit uses a function indicated by the following equation:

$$a \cdot c \cdot \frac{y_1 - b}{y_0 - d}$$

where a value of the luminance signal is set at $y_0$, a value of the tone conversion-processed luminance signal is set at $y_1$, and constant terms are set at a, b, c, d, as the function; and the function setting unit comprises:

a hue information calculation unit that calculates hue-related information from the color signal;

a threshold setting unit that sets the luminance value when the maximum chroma is indicated in the hue region to which the color image signal belongs as a threshold relating to the luminance signal and the tone conversion-processed luminance signal on the basis of the hue-related information; and a constant term definition unit that defines the constant terms a, b, c, d on the basis of the threshold and the maximum value of the luminance signal in the color space.

2. The image processing apparatus as defined in claim 1, wherein the color image signal is constituted by a plurality of color image signals taken in chronologically from the imaging system, and the color space conversion unit converts the plurality of color image signals into a luminance signal and a color signal in the color space.

3. The image processing apparatus as defined in claim 1, wherein the function setting unit comprises:

a function recording unit that records a plurality of predetermined functions;

a hue information calculation unit that calculates hue-related information from the color signal;

a threshold setting unit that sets the luminance value when the maximum chroma is indicated in the hue region to which the color image signal belongs as a threshold relating to the luminance signal and the tone conversion-processed luminance signal on the basis of the hue-related information; and a function selection unit that selects one of the plurality of functions recorded in the function recording unit on the basis of the luminance signal, the tone conversion-processed luminance signal, and the threshold.

4. The image processing apparatus as defined in claim 3, wherein the function recording unit records four functions defined by the following equation:

$$\frac{y_1}{y_0}, a\frac{y_1 - b}{y_0}, c\frac{y_1}{y_0 - d}, \frac{y_1 - b}{y_0 - d}$$

where a value of the luminance signal is set at $y_0$, a value of the tone conversion-processed luminance signal is set at $y_1$, and constant terms are set at a, b, c, d.

5. The image processing apparatus as defined in claim 4, wherein the function setting unit further comprises a constant term definition unit that defines the constant terms a, b, c, d on the basis of the following equation:

$$a = \frac{y_{th}}{y_{th} - y_{max}}, b = y_{max}, c = \frac{y_{th} - y_{max}}{y_{th}}, d = y_{max}$$

where the maximum value of the luminance signal in the color space is set at $y_{max}$, and the threshold determined by the threshold setting unit is set at $y_{th}$.

6. The image processing apparatus as defined in claim 3, wherein the function selection unit comprises:

a first comparing unit that compares the luminance signal with the threshold;

a second comparing unit that compares the tone conversion-processed luminance signal with the threshold; and a function reading unit that reads one of the plurality of functions recorded in the function recording unit on the basis a comparison result of the first comparing unit and the second comparing unit.

7. The image processing apparatus as defined in claim 1, wherein the chroma correction unit comprises:

a chroma correction coefficient calculation unit that calculates a chroma correction coefficient from the luminance signal and the tone conversion-processed luminance signal using the set function; and a multiplication unit that multiplies the color signal by the chroma correction coefficient.

8. The image processing apparatus as defined in claim 7, wherein the chroma correction unit further comprises a bit shift unit that extracts a predetermined higher order bit component from the luminance signal and the tone conversion-processed luminance signal.

9. The image processing apparatus as defined in claim 4, wherein the chroma correction unit comprises:

a first subtraction unit that subtracts a predetermined constant term from the luminance signal;

a table unit that outputs an inverse of the luminance signal following subtraction of the constant term;

a second subtraction unit that subtracts a predetermined constant term from the tone conversion-processed luminance signal;

a chroma correction coefficient calculation unit that calculates a chroma correction coefficient by multiplying the inverse of the luminance signal following subtraction of the constant term, the tone conversion-processed luminance signal following subtraction of the constant term, and a predetermined constant term; and a multiplication unit that multiplies the color signal by the chroma correction coefficient.

10. The image processing apparatus as defined in claim 9, wherein the chroma correction unit further comprises a bit shift unit that extracts a predetermined higher order bit component from the luminance signal and the tone conversion-processed luminance signal.

11. The image processing apparatus as defined in claim 9, wherein the chroma correction unit further comprises:

a comparing unit that compares a magnitude of a denominator term of the function with a predetermined threshold; and a setting unit that sets the chroma correction coefficient at 1 when the magnitude of the denominator term is smaller than the predetermined threshold.

12. The image processing apparatus as defined in claim 1, wherein the chroma correction unit comprises:

a first subtraction unit that subtracts a predetermined constant term from the luminance signal;

a table unit that outputs an inverse of the luminance signal following subtraction of the constant term;

a second subtraction unit that subtracts a predetermined constant term from the tone conversion-processed luminance signal;

a chroma correction coefficient calculation unit that calculates a chroma correction coefficient by multiplying the inverse of the luminance signal following subtraction of the constant term, the tone conversion-processed luminance signal following subtraction of the constant term, and a predetermined constant term; and a multiplication unit that multiplies the color signal by the chroma correction coefficient.

13. The image processing apparatus as defined in claim 12, wherein the chroma correction unit further comprises a bit shift unit that extracts a predetermined higher order bit component from the luminance signal and the tone conversion-processed luminance signal.

14. The image processing apparatus as defined in claim 12, wherein the chroma correction unit further comprises:
    a comparing unit that compares a magnitude of a denominator term of the function with a predetermined threshold; and
    a setting unit that sets the chroma correction coefficient at 1 when the magnitude of the denominator term is smaller than the predetermined threshold.

15. The image processing apparatus as defined in claim 2, further comprising an update control unit that performs control to update the tone conversion characteristic only when a predetermined condition is satisfied.

16. The image processing apparatus as defined in claim 15, wherein the update control unit comprises:
    a variation detection unit that detects a scene variation during shooting; and
    an update operation control unit that controls the tone conversion unit to update the tone conversion characteristic when the scene variation is detected.

17. The image processing apparatus as defined in claim 15, wherein the update control unit comprises:
    a time detection unit that detects a predetermined shooting time; and
    an update operation control unit that controls the tone conversion unit to update the tone conversion characteristic when the predetermined shooting time is detected.

18. The image processing apparatus as defined in claim 1, wherein the tone conversion unit comprises:
    an appropriate region extraction unit that extracts an appropriate exposure region on the basis of the luminance signal;
    an edge calculation unit that calculates an edge amount in relation to the appropriate exposure region;
    a histogram creation unit that creates a histogram on the basis of the edge amount;
    a tone conversion characteristic calculation unit that calculates a tone conversion characteristic on the basis of the histogram; and
    a conversion processing unit that performs tone conversion processing on the luminance signal on the basis of the tone conversion characteristic.

19. The image processing apparatus as defined in claim 18, wherein the tone conversion unit further comprises:
    a region of interest setting unit that sets a region of interest from the color image signal;
    a weighting factor setting unit that sets a weighting factor in relation to the region of interest; and
    a histogram correction unit that corrects the histogram on the basis of the weighting factor.

20. The image processing apparatus as defined in claim 1, wherein the tone conversion unit comprises:
    a division unit that divides the luminance signal into a plurality of regions;
    an appropriate region extraction unit that extracts an appropriate exposure region on the basis of the luminance signal for each of the regions;
    an edge calculation unit that calculates an edge amount in relation to the appropriate exposure region for each of the regions;
    a histogram creation unit that creates a histogram on the basis of the edge amount for each of the regions;
    a tone conversion characteristic calculation unit that calculates a tone conversion characteristic on the basis of the histogram for each of the regions; and
    a conversion processing unit that performs tone conversion processing on the luminance signal on the basis of the tone conversion characteristic.

21. The image processing apparatus as defined in claim 20, wherein the conversion processing unit comprises:
    a subject pixel extraction unit that extracts a subject pixel from the luminance signal;
    a distance calculation unit that calculates distance information from the subject pixel to a center of a plurality of the regions positioned near the subject pixel; and
    an interpolation calculation unit that calculates a tone conversion characteristic to be used in tone conversion processing of the subject pixel by means of an interpolation calculation based on a tone conversion characteristic of the plurality of regions positioned near the subject pixel and the distance information.

22. The image processing apparatus as defined in claim 1, wherein either one of a YCbCr color space and a YIQ color space is used as the color space.

23. The image processing apparatus as defined in claim 1, further comprising a color space inversion unit that converts the tone conversion-processed luminance signal and the chroma correction-processed color signal into a tone-processed color image signal.

24. The image processing apparatus as defined in claim 1, wherein the imaging system employs either a single imaging device having a primary color filter disposed on a front surface or a single imaging device having a color difference line sequential-type complementary color filter disposed on a front surface.

25. A non transitory computer readable medium storing. An image processing program for performing tone conversion processing on a color image signal taken in from an imaging system, the program comprising:
    a color space conversion step of converting the color image signal into a luminance signal and a color signal in a predetermined color space;
    a tone conversion step of performing tone conversion processing on the luminance signal on the basis of a predetermined tone conversion characteristic;
    a function setting step of setting a function for chroma correction processing using the luminance signal, the tone conversion-processed luminance signal, a maximum value of the luminance signal in the color space, and a luminance value when a maximum chroma is indicated in a hue region to which the color image signal belongs, as parameters; and
    a chroma correction step of performing chroma correction processing on the color signal using the luminance signal, the tone conversion-processed luminance signal, and the function, and
    wherein the function setting step uses a function indicated by the following equation:

$$a \cdot c \cdot \frac{y_1 - b}{y_0 - d}$$

where a value of the luminance signal is set at $y_0$, a value of the tone conversion-processed luminance signal is set at $y_1$, and constant terms are set at a, b, c, d, as the function; and the function setting step comprises:
a hue information calculation step of calculating hue-related information from the color signal
a threshold setting step of setting the luminance value when the maximum chroma is indicated in the hue region to which the color image signal belongs as a threshold relating to the luminance signal and the tone conversion-processed luminance signal on the basis of the hue-related information; and
a constant term definition step of defining the constant terms a, b, c, d on the basis of the threshold and the maximum value of the luminance signal in the color space.

26. The image processing program as defined in claim 25, wherein the color image signal is constituted by a plurality of color image signals taken in chronologically from the imaging system, and
the color space conversion step is for converting the plurality of color image signals into a luminance signal and a color signal in the color space.

27. The image processing program as defined in claim 25, wherein the function setting step comprises:
a function recording step of recording a plurality of predetermined functions;
a hue information calculation step of calculating hue-related information from the color signal;
a threshold setting step of setting the luminance value when the maximum chroma is indicated in the hue region to which the color image signal belongs as a threshold relating to the luminance signal and the tone conversion-processed luminance signal on the basis of the hue-related information; and
a function selection step of selecting one of the plurality of functions recorded in the function recording step on the basis of the luminance signal, the tone conversion-processed luminance signal, and the threshold.

28. The image processing program as defined in claim 27, wherein the function recording step is for recording four functions defined by the following equation:

$$\frac{y_1}{y_0}, a\frac{y_1-b}{y_0}, c\frac{y_1}{y_0-d}, \frac{y_1-b}{y_0-d}$$

where a value of the luminance signal is set at $y_0$, a value of the tone conversion-processed luminance signal is set at $y_1$, and constant terms are set at a, b, c, d.

29. The image processing program as defined in claim 28, wherein the function setting step further comprises a constant term definition step of defining the constant terms a, b, c, d on the basis of the following equation:

$$a = \frac{y_{th}}{y_{th} - y_{max}}, b = y_{max}, c = \frac{y_{th} - y_{max}}{y_{th}}, d = y_{max}$$

where the maximum value of the luminance signal in the color space is set at $y_{max}$, and the threshold determined by the threshold setting unit is set at $y_{th}$.

30. The image processing program as defined in claim 27, wherein the function selection step comprises:
a first comparing step of comparing the luminance signal with the threshold;
a second comparing step of comparing the tone conversion-processed luminance signal with the threshold; and
a function reading step of reading one of the plurality of functions recorded in the function recording step on the basis a comparison result of the first comparing step and the second comparing step.

31. The image processing program as defined in claim 25, wherein the chroma correction step comprises:
a chroma correction coefficient calculation step of calculating a chroma correction coefficient from the luminance signal and the tone conversion-processed luminance signal using the set function; and
a multiplication step of multiplying the color signal by the chroma correction coefficient.

32. The image processing program as defined in claim 31, wherein the chroma correction step further comprises a bit shift step of extracting a predetermined higher order bit component from the luminance signal and the tone conversion-processed luminance signal.

33. The image processing program as defined in claim 26, further comprising an update control step of performing control to update the tone conversion characteristic only when a predetermined condition is satisfied.

34. An image processing method for performing tone conversion processing on a color image signal taken in from an imaging system, comprising:
a color space conversion step of converting the color image signal into a luminance signal and a color signal in a predetermined color space;
a tone conversion step of performing tone conversion processing on the luminance signal on the basis of a predetermined tone conversion characteristic;
a function setting step of setting a function for chroma correction processing using the luminance signal, the tone conversion-processed luminance signal, a maximum value of the luminance signal in the color space, and a luminance value when a maximum chroma is indicated in a hue region to which the color image signal belongs, as parameters, and by using as the function the following equation:

$$a \cdot c \cdot \frac{y_1 - b}{y_0 - d}$$

where a value of the luminance signal is set at $y_0$, a value of the tone conversion-processed luminance signal is set at $y_1$, and constant terms are set at a, b, c, d, as the function; and the function setting unit comprises:
a hue information calculation unit that calculates hue-related information from the color signal;
a threshold setting unit that sets the luminance value when the maximum chroma is indicated in the hue region to which the color image signal belongs as a threshold relating to the luminance signal and the tone conversion-processed luminance signal on the basis of the hue-related information; and
a constant term definition unit that defines the constant terms a, b, c, d on the basis of the threshold and the maximum value of the luminance signal in the color space; and
a chroma correction step of performing chroma correction processing on the color signal using the luminance signal, the tone conversion-processed luminance signal, and the function.

* * * * *